United States Patent
Toosky et al.

(10) Patent No.: US 7,823,262 B2
(45) Date of Patent: Nov. 2, 2010

(54) METHOD OF REPLACING A NUT PLATE FASTENER ASSEMBLY

(75) Inventors: Rahmatollah Fakhri Toosky, San Clemente, CA (US); Soheil Eshraghi, Irvine, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 751 days.

(21) Appl. No.: 11/683,275

(22) Filed: Mar. 7, 2007

(65) Prior Publication Data
US 2007/0224016 A1    Sep. 27, 2007

Related U.S. Application Data

(60) Provisional application No. 60/782,206, filed on Mar. 14, 2006.

(51) Int. Cl.
*B23P 6/00* (2006.01)
*B23P 11/00* (2006.01)
*F16B 37/06* (2006.01)

(52) U.S. Cl. ............... 29/402.03; 29/402.08; 29/522.1; 29/523; 29/525.01; 29/525.02; 29/525.05; 29/525.11; 411/108; 411/181

(58) Field of Classification Search .............. 29/402.01, 29/402.03, 402.06, 402.08, 402.12, 402.15, 29/402.17, 521, 522.1, 525.01, 525.02, 525.03, 29/525.05, 525.11, 523; 411/181, 71, 108, 411/113, 69, 501
See application file for complete search history.

(56) References Cited

U.S. PATENT DOCUMENTS

| | | | |
|---|---|---|---|
| 4,732,518 A | 3/1988 | Toosky | |
| 5,096,349 A | 3/1992 | Landy et al. | |
| 5,245,743 A | 9/1993 | Landy et al. | |
| 5,405,228 A | 4/1995 | Reid et al. | |
| 6,991,413 B2* | 1/2006 | Ballou et al. | 411/15 |
| 7,059,816 B2 | 6/2006 | Toosky | |
| 7,100,264 B2* | 9/2006 | Skinner et al. | 29/523 |
| 7,114,900 B2 | 10/2006 | Toosky | |
| 7,237,314 B2 | 7/2007 | Toosky | |
| 2005/0117994 A1 | 6/2005 | Toosky | |
| 2006/0075617 A1 | 4/2006 | Toosky et al. | |

* cited by examiner

*Primary Examiner*—Jermie E Cozart
(74) *Attorney, Agent, or Firm*—Clark Hill PLC

(57) ABSTRACT

A repair/replacement nut plate assembly, which is fully pre-assembled, is provided which can be inserted into an oversized or reworked/reconditioned aperture of a workpiece after an original nut plate has been removed from the original aperture of the workpiece. The repair/replacement nut plate assembly includes a nut, a holding bracket, a stem, a nut retainer, and a sleeve member. The sleeve member is configured to be secured to a nut plate assembly, of the same type originally used to provide the original nut plate in the original aperture of the workpiece to compensate for material lost from the workpiece during the removal of the original nut plate. The sleeve member allows for the original nut plate assembly to be utilized, with only the securement of the sleeve member to the holding bracket prior to setting.

29 Claims, 23 Drawing Sheets

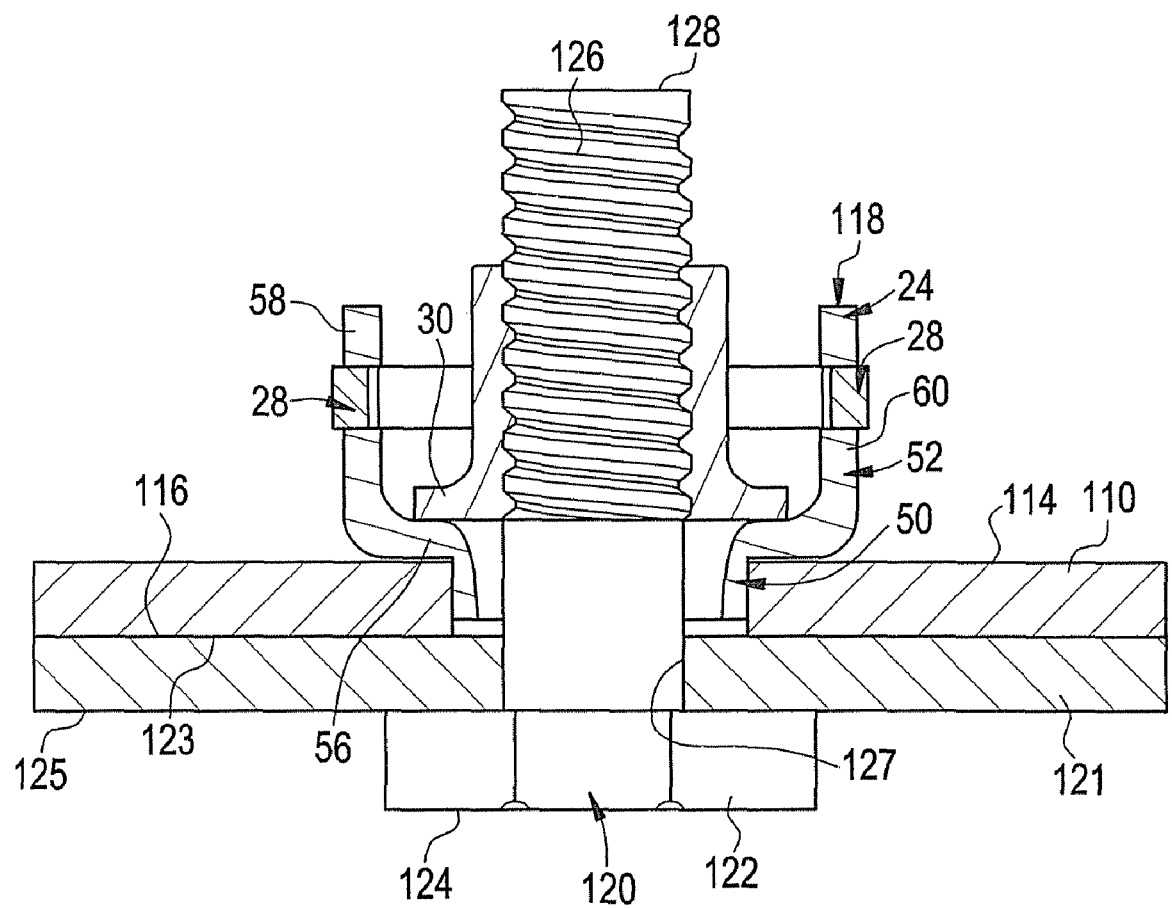

FIG. 10
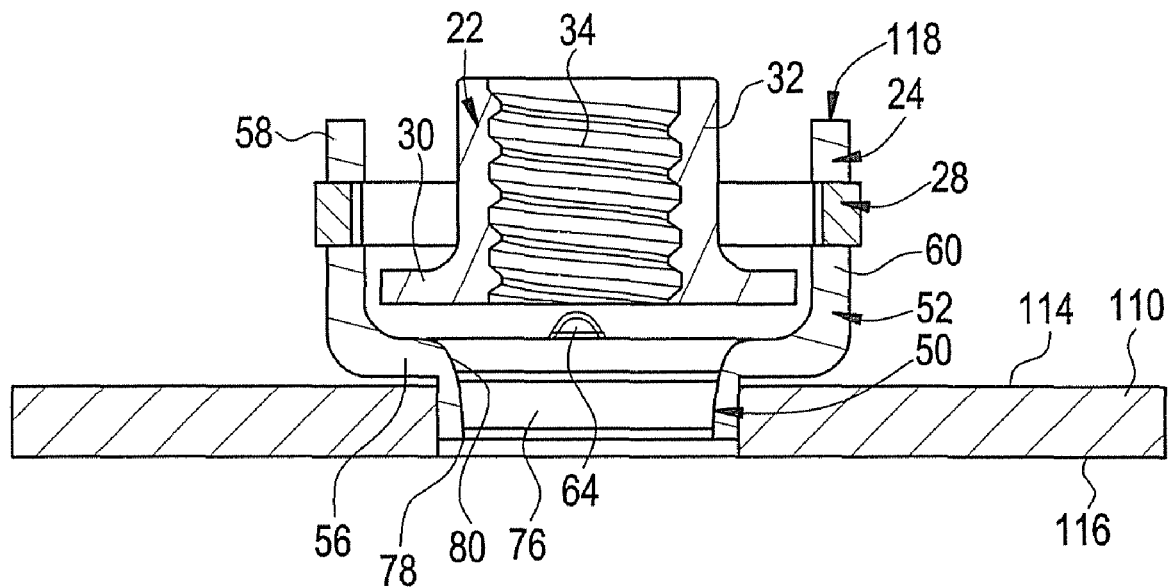
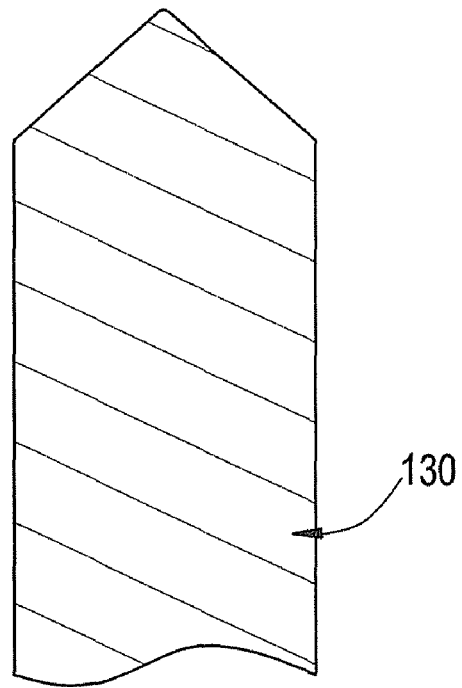

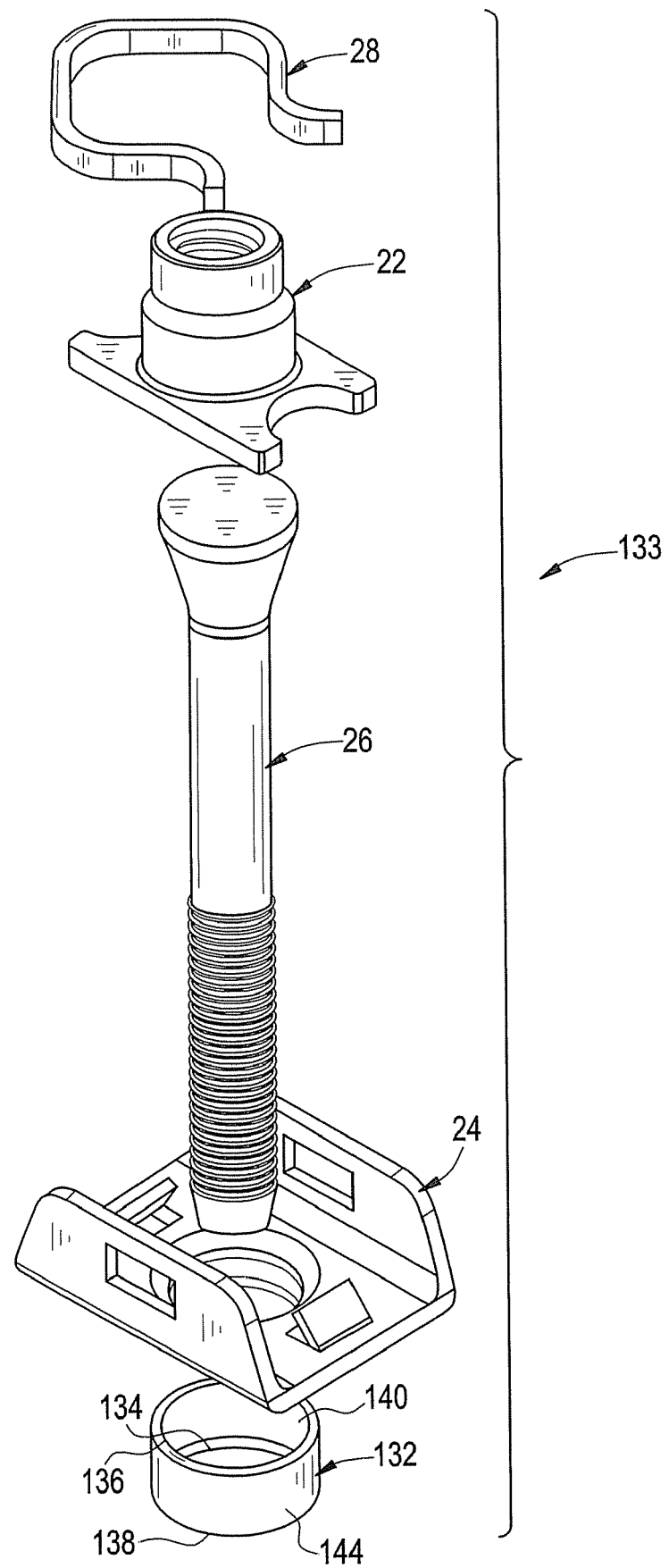

FIG. 23
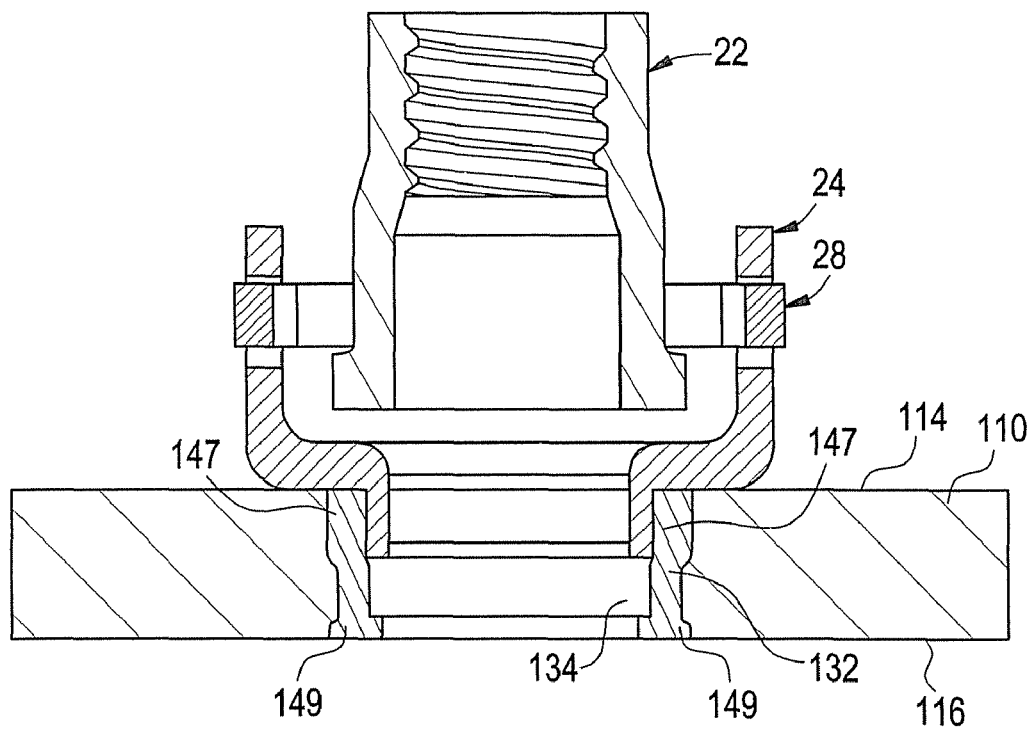
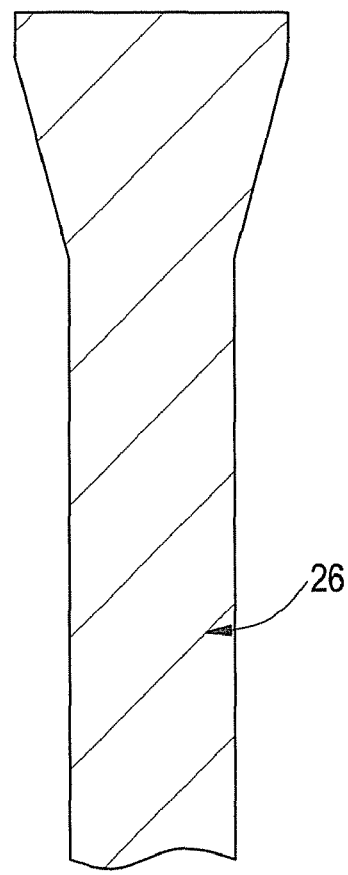

FIG. 24
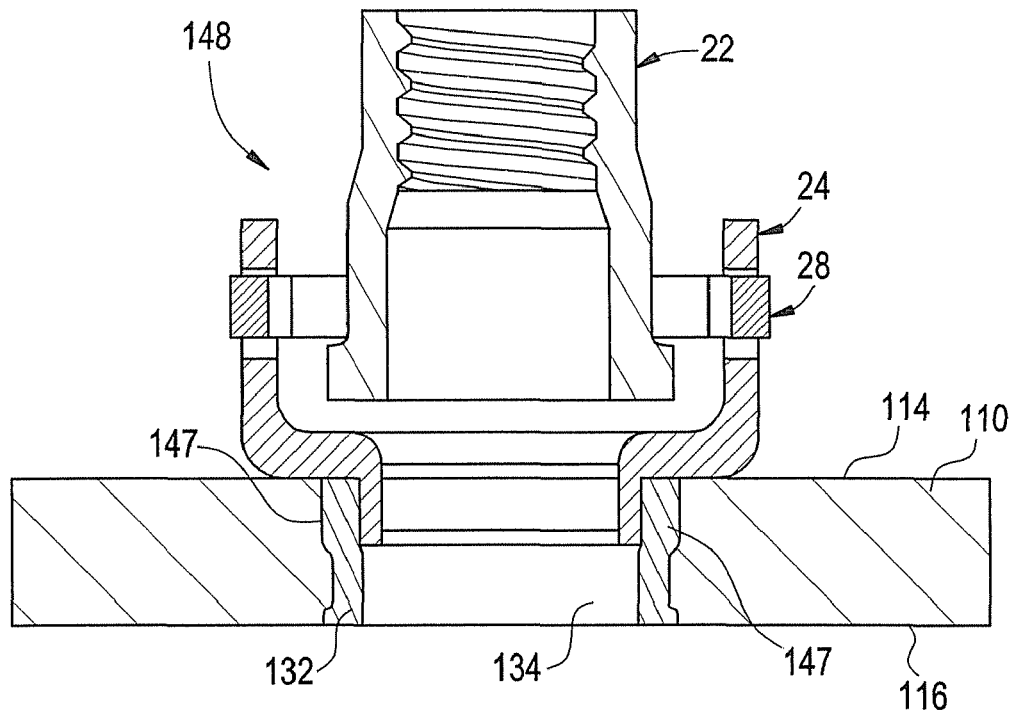
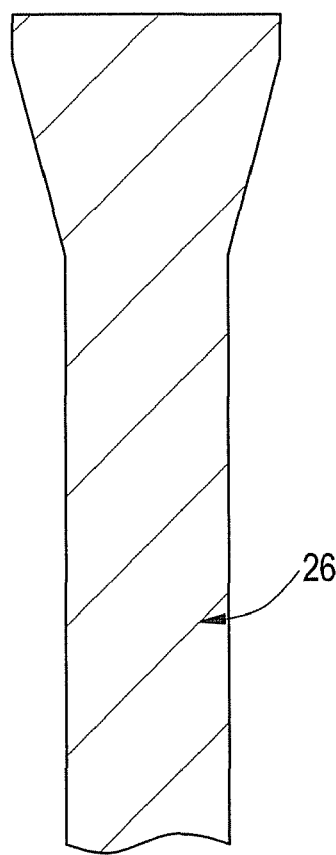

METHOD OF REPLACING A NUT PLATE FASTENER ASSEMBLY

RELATED APPLICATION (PRIORITY CLAIM)

This application claims the benefit of U.S. Provisional Application Ser. No. 60/782,206, filed Mar. 14, 2006, which is hereby incorporated herein by reference in its entirety.

BACKGROUND OF THE INVENTION

The present invention relates to nut plate fasteners and to repair assemblies for same.

Fasteners are used in the aerospace industry for securing at least two workpieces together. Fasteners used in such installations may include a nut plate and a nut which are part of an assembly. There are many different design configurations of nut plates being used today. Two major classes are riveted nut plates and rivetless nut plates.

In riveted nut plates, two rivets are employed for attaching the body of the nut plate to the workpiece. To eliminate the potential for leakage through the openings of the riveted nut plates, sealant is used between the workpiece and the nut plate.

With regard to rivetless nut plates, some designs provide that a sleeve is flared against a workpiece. One example of this type of rivetless nut plate is disclosed in U.S. Pat. No. 4,732,518, which is hereby incorporated herein by reference in its entirety. The '518 patent illustrates the insertion of a sleeve inside a workpiece against heavy interference forces and then deformation of the sleeve to produce flaring of the end of the sleeve. The sleeve has a serration/lobe configuration thereon with the serration/lobe configuration being long and tapered such that the serrations/lobes extend into the walls of the workpiece. The tapered feature, length and specific geometry are necessary to make installation possible with the method of installation which was chosen for its application. The main object of the '518 patent with its tapered and extended serration/lobe configuration was to enhance the fatigue life of the workpiece by distributing the load throughout the workpiece and providing expansion due to the insertion of the sleeve into the workpiece, and to cold work the material adjacent the perimeter of the workpiece aperture.

Other nut plate designs do not rely on flaring of the sleeve. U.S. Pat. Nos. 5,096,349, 5,245,743, 5,405,228 and pending U.S. patent application Ser. No. 10/272,721 (filed Oct. 17, 2002) and Ser. No. 10/929,701 (filed Aug. 30, 2004) disclose rivetless nut plate designs which do not rely on flaring of the sleeve, and these five items are hereby incorporated herein by reference in their entirety. While some rivetless nut plate designs rely on adhesive for attaching the nut plate to the structure, the designs disclosed in the five items cited above rely on heavily cold-worked holes and high interference engagement utilizing a hardened pin as the installation tool to expand a sleeve element into engagement with a workpiece structure. Because of high level expansion, the friction forces created are intended to retain the nut plate and provide expected mechanical properties.

Once installed, it is sometimes necessary to remove and replace the fastener. Most rivetless nut plates are removed by drilling out the flared sleeve portion, or by drilling out the rivets while holding the nut plate. Drilling out the rivets and the sleeve from the holes requires a special skill.

The process of removing the fastener may affect the size and quality of the hole thereby causing the installation of a new fastener to be impractical. The customary approach to this problem is to design an oversized fastener and to install this oversized fastener in a hole larger than that required for the original fastener.

The design and development of oversized fasteners, however, is expensive. The limited usage, for repair applications only, drives the fastener's unit cost high. There is also the requirement of maintaining these oversized fasteners in inventory and the oversized fasteners are not readily available on the market.

It is noted that if the damage to the hole caused by removing the original fastener is minor, it is possible that the same standard rivetless nut plate may be used such that it will still deliver the expected mechanical properties. Guidelines for this type of repair should be based on test results, empirical analysis, and proper engineering judgment.

The assignee of this invention has also invented a reconditioning tool that allows working and conditioning of the hole from which the original fastener was removed, back to its original condition, such that the same standard rivetless nut plate may again be used. The structure and use of this reconditioning tool is described and illustrated in co-pending U.S. patent application Ser. No. 11/218,076 which was filed on Sep. 1, 2005, which is incorporated herein by reference in its entirety.

There are instances, though, where the damage to the hole cannot be sufficiently reworked/reconditioned by the reconditioning tool described and illustrated in U.S. patent application Ser. No. 11/218,076 such that the same standard rivetless nut plate may not again be used. Where the aperture is either oversized by drilling or cannot be sufficiently reworked/reconditioned, an oversized fastener must currently be used. As it is undesirable to use oversized fasteners, there is a desire that in repair and replacement of the fasteners, that the same size and type of fastener can be used, rather than having to use a specially designed oversized fastener for this purpose. The present invention provides for same.

SUMMARY OF THE INVENTION

Briefly, and in accordance with the foregoing, the present invention provides a repair/replacement nut plate assembly, which is fully preassembled, which can be inserted into an oversized or reworked/reconditioned aperture of a workpiece after an original nut plate has been removed from the original aperture of the workpiece. The repair/replacement nut plate assembly includes a nut, a holding bracket, a stem, a nut retainer, and a sleeve member. The sleeve member is configured to be secured to a nut plate assembly, of the same type originally used to provide the original nut plate in the original aperture of the workpiece to compensate for material lost from the workpiece during the removal of the original nut plate, and to increase the size of the hole. The sleeve member allows for the original nut plate assembly to be utilized, with only the securement of the sleeve member to the holding bracket prior to setting.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which:

FIGS. 7-9 illustrate the setting of the nut plate assembly into an aperture of a first workpiece to provide a nut plate, and the fastening of a second workpiece to the first workpiece by way of a bolt being secured to the nut plate;

FIG. 10 illustrates the nut plate being removed from the aperture of the first workpiece;

FIG. 12 is an exploded perspective view of a repair/replacement nut plate assembly of the invention;

FIGS. 21-25 illustrate the setting of the repair/replacement nut plate assembly into either the oversized or the reworked/reconditioned aperture of the first workpiece to provide a repair/replacement nut plate, and a bolt being secured to the repair/replacement nut plate, which fastens the second workpiece in place.

DETAILED DESCRIPTION OF THE ILLUSTRATED EMBODIMENTS

Figure 1:
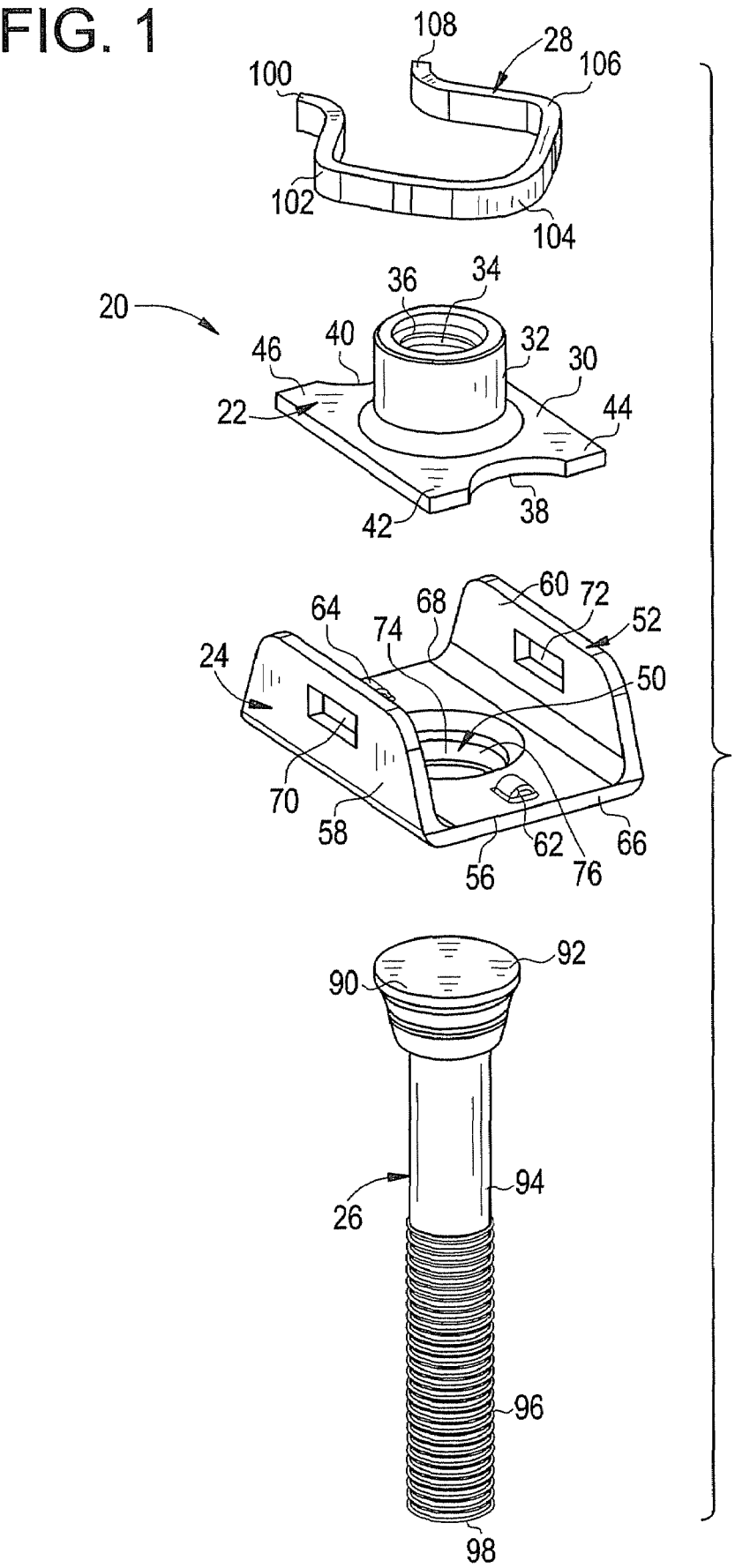
FIG. 1 is an exploded perspective view of a nut plate assembly.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Figure 2:
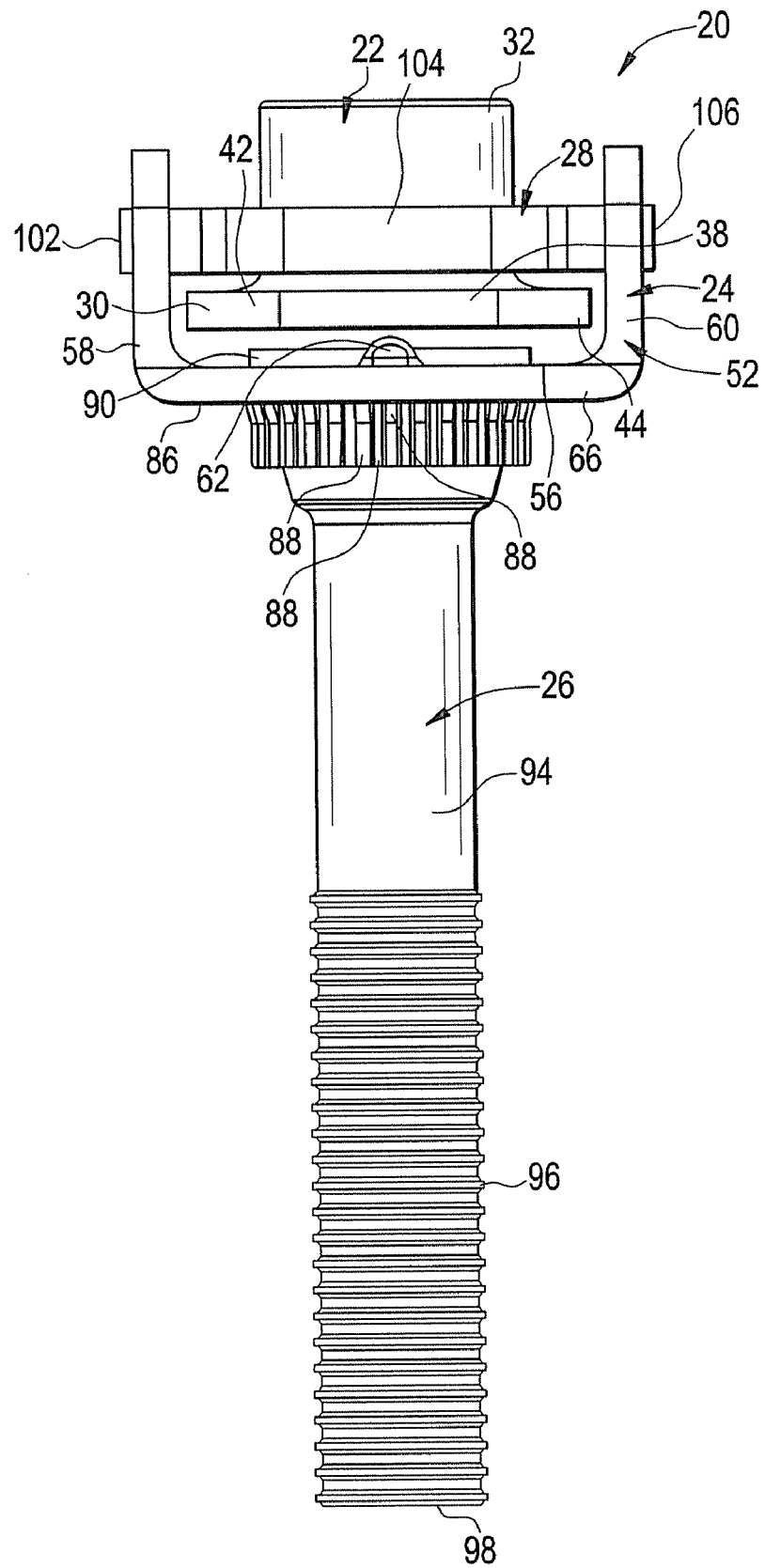
FIG. 2 is a side elevational view of the nut plate assembly of FIG. 1.
Figure 3:
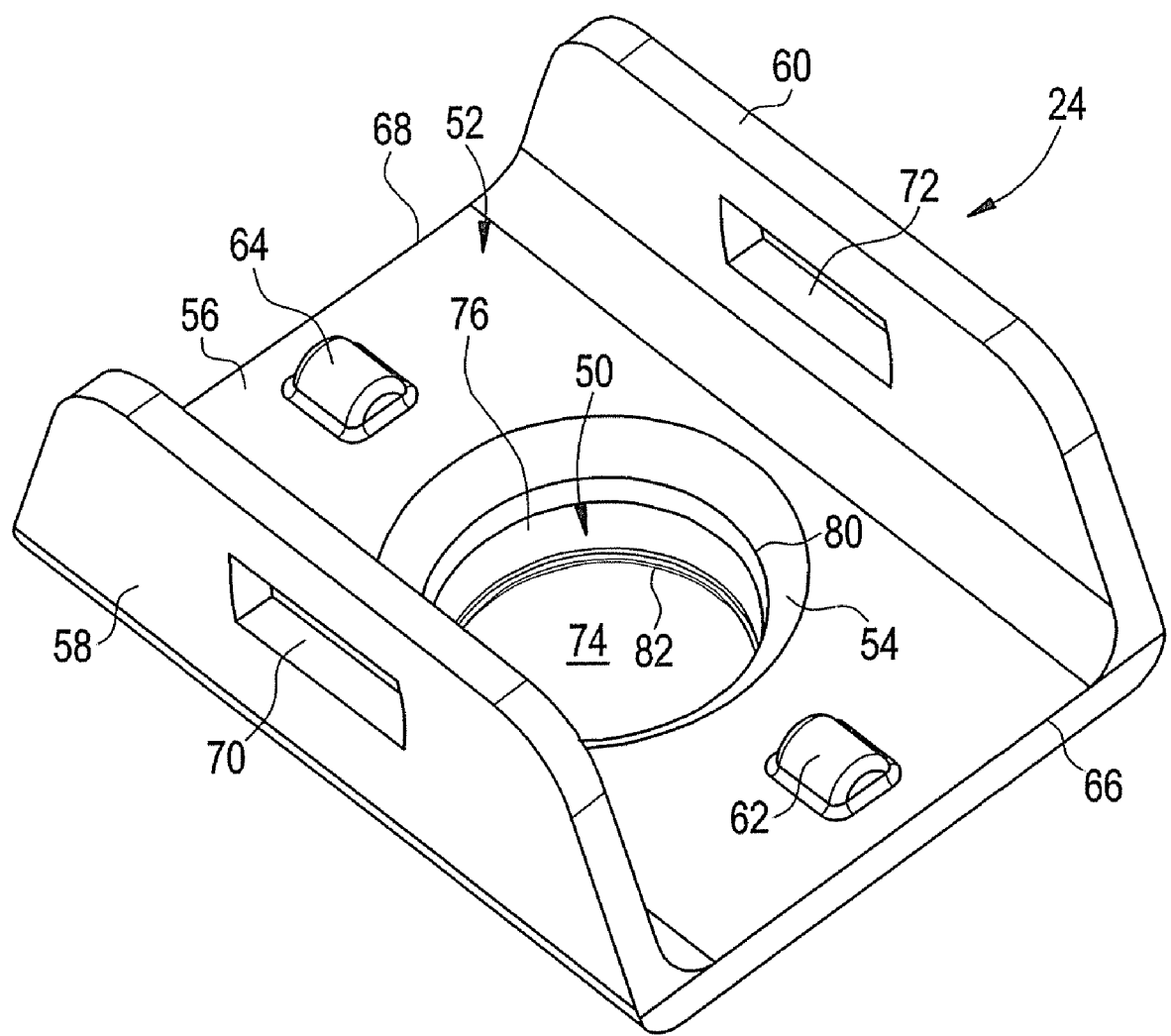
FIG. 3 is a perspective view of a holding bracket of the nut plate assembly of FIG. 1.
Figure 4:
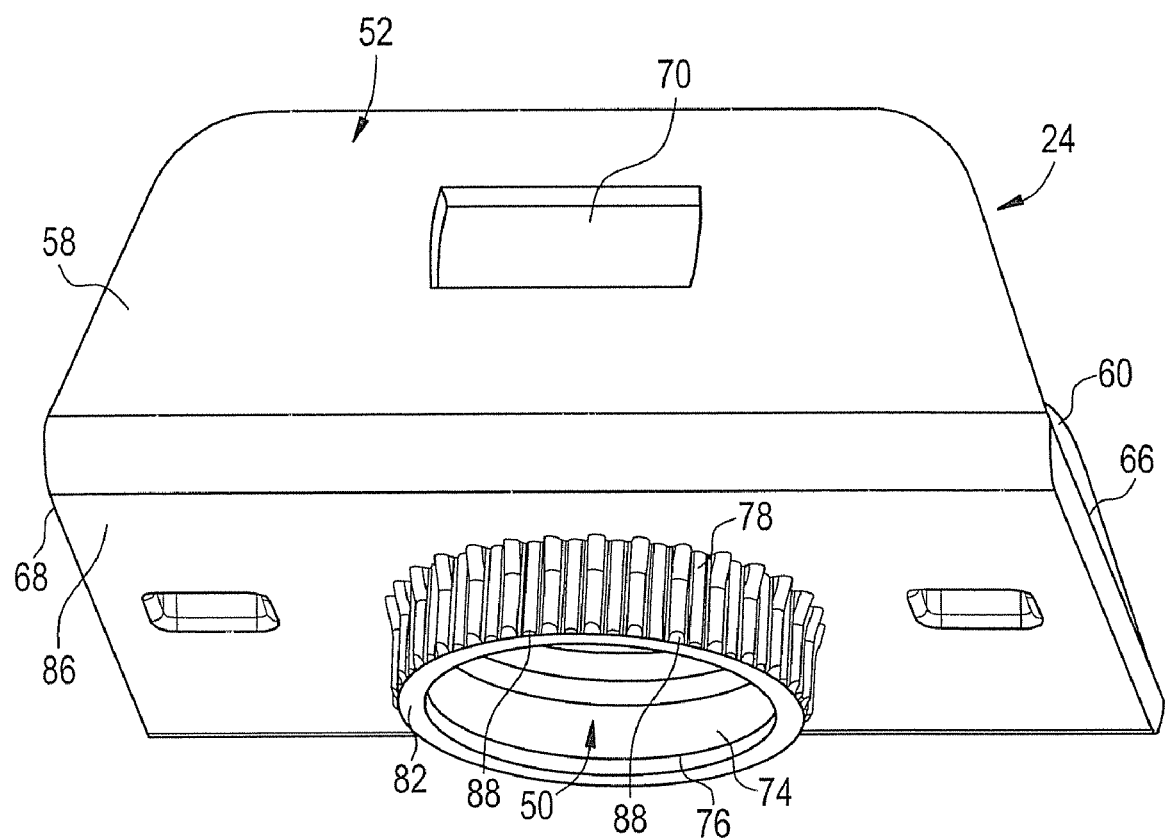
FIG. 4 is an alternative perspective view of the holding bracket of FIG. 3.

A nut plate assembly 20, which is fully preassembled, is generally illustrated in FIGS. 1 and 2. The nut plate assembly 20 is of the type described and illustrated in U.S. patent application Ser. No. 10/272,721, filed Oct. 17, 2002 and entitled "Nut Plate", which is incorporated herein in its entirety. It is to be understood that the invention is described and illustrated with regard to the nut plate assembly 20, but that the invention can also be configured or utilized to work with other types of nut plate assemblies, as will be described further hereinbelow. The nut plate assembly 20 includes a nut 22, a holding bracket 24, a stem 26 and a retainer 28.

The nut 22 is best illustrated in FIGS. 1 and 2 The nut 22 includes a base portion 30 and a portion 32 which extends upwardly therefrom, which is generally cylindrical in configuration. An aperture 34 is provided through the base portion 30 and the portion 32 which defines an aperture wall 36. The aperture wall 36 is generally threaded such that a fastener 120, such as a bolt, can be attached thereto. The base portion 30 includes end recesses 38, 40 and axially projecting end portions 42, 44 and 46, 48 situated on opposite sides of the recesses 38, 40, respectively.

The holding bracket 24 is best illustrated in FIGS. 3-6. The holding bracket 24 is generally Y-shaped in side elevation and includes a tubular portion 50 and a bracket portion 52 which extends outwardly from the tubular portion 50 at a first end 54 thereof. The bracket portion 52 includes a base portion 56 and opposed upstanding side walls 58, 60. The base portion 56 has a pair of protrusions 62, 64 which protrude upwardly from the base portion 56. Protrusion 62 is provided proximate to edge 66 of the base portion 56 and protrusion 64 is provided proximate to edge 68 of the base portion 56. Slots 70, 72 extend through the side walls 58, 60 of the bracket portion 52.

Figure 5:
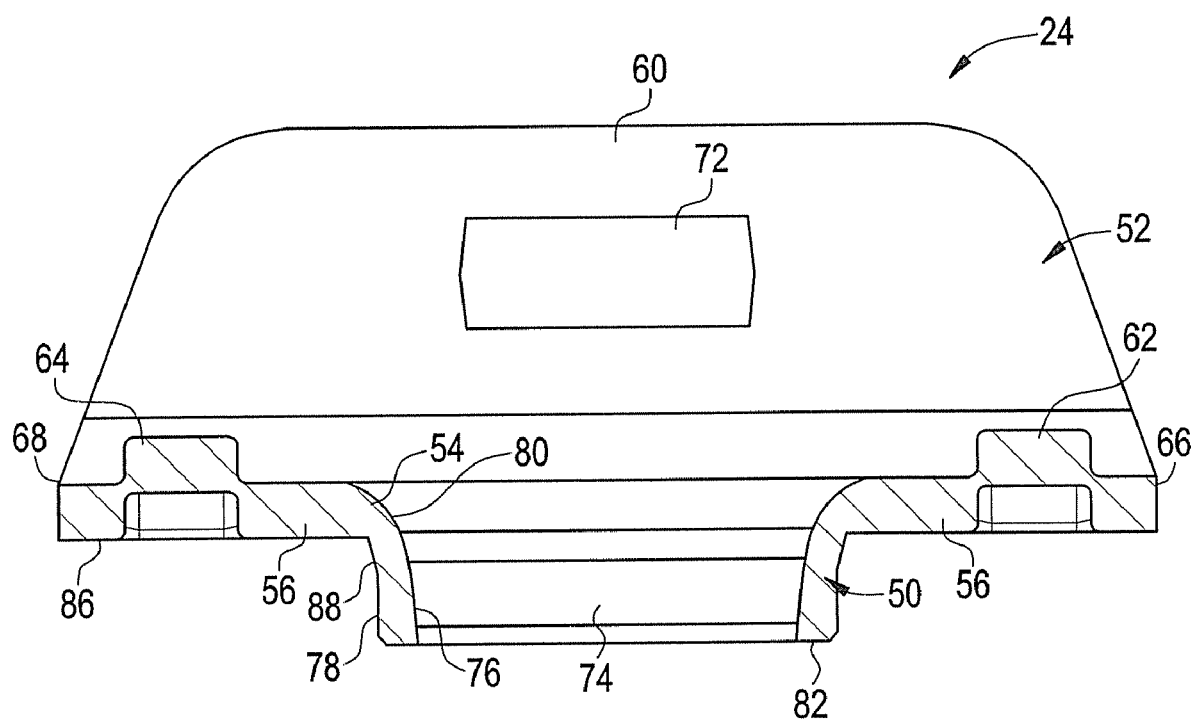
FIG. 5 is a cross-sectional view of the holding bracket of FIG. 3.
Figure 6:
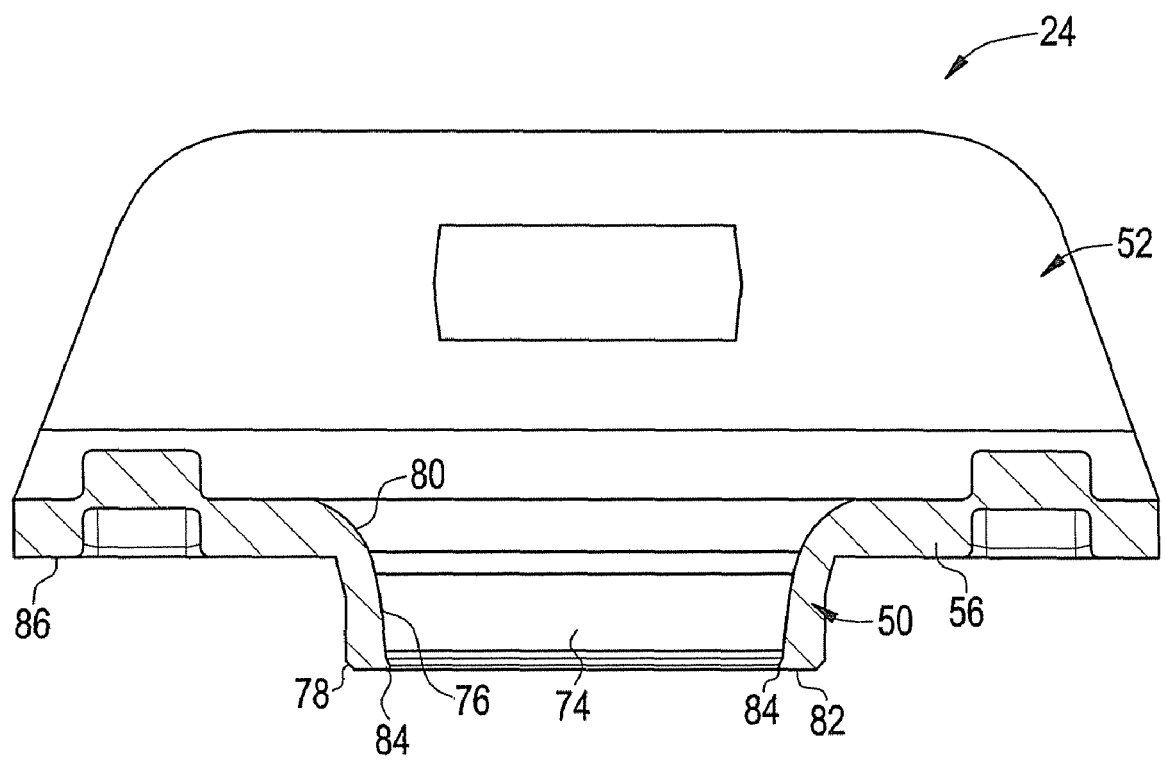
FIG. 6 is a cross-sectional view of the holding bracket of FIG. 3, where a lip is provided.

The tubular portion 50 extends in the opposite direction from the base portion 56 of the bracket portion 52 than do the side walls 58, 60 and the protrusions 62, 64 of the bracket portion 52. The tubular portion 50 has an aperture 74 therethrough which defines an inner wall 76 of the tubular portion 50. The tubular portion 50 also has an outer wall 78. From the first end 54 of the tubular portion 50, the inner wall 76 preferably curves inwardly to provide a shoulder 80. From the shoulder 80 to a second end 82 of the tubular portion 50, the inner wall 76 is preferably tapered or stepped such that the diameter of the inner wall 76 is gradually reduced, as illustrated in FIG. 5. If desired, the inner wall 76 need not be tapered. If desired, the inner wall 76 may alternatively be configured to have a lip 84 provided proximate to the second end 82, as illustrated in FIG. 6, which further reduces the diameter of the inner wall 76. The lip 84 is shown with the inner wall 76 being tapered.

The outer wall 78 of the tubular portion 50 extends from an undersurface 86 of the bracket portion 52 to the second end 82 of the tubular portion 50. Lobes or ribs 88 may extend outwardly from the outer wall 78 of the tubular portion 50 if desired. The purpose for the lobes/ribs 88 will be discussed further herein. The configuration of the lobes/ribs 88 can be varied as desired.

The stem 26 is best illustrated in FIGS. 1 and 2. The stem 26 includes an enlarged head portion 90 at a first end 92 thereof and an elongated portion 94, which is preferably cylindrical, which extends from the enlarged head portion 90. The enlarged head portion 90 tapers to the elongated portion 94. The elongated portion 94 has a tool engaging section 96 proximate to a second end 98 of the stem 26. The enlarged head portion 90 may have a cavity (not shown) provided therein to help in the deformation of the enlarged head portion 90, which will be discussed herein, although a cavity need not be provided to deform the enlarged head portion 90.

The retainer 28 is best illustrated in FIGS. 1 and 2. The retainer 28 may be a spring formed from rectangular wire bent into the form illustrated. The retainer 28 is preferably one piece and extends from end portion 100, to side portion 102, then to middle portion 104, then to side portion 106, and then to end portion 108.

The second end 98 of the stem 26 is positioned within the aperture 74 of the tubular portion 50 of the holding bracket 24 at the first end 54 thereof such that the enlarged head portion 90 of the stem 26 rests on the shoulder 80 of the inner wall 76 of the tubular portion 50.

The nut 22 is connected to the holding bracket 24 by the base portion 30 being positioned against the base portion 56 of the bracket portion 52 such that the protrusions 62, 64 on the base portion 56 are positioned within the recesses 38, 40 of the nut 22. The retainer 28 is attached to the bracket portion 52 to hold the nut 22 within the confines defined by the bracket portion 52 and the retainer 28, but such that the nut 22 is allowed to float in at least one dimension, but preferably in three dimensions, in order to facilitate and permit alignment of a fastener 118, such as a bolt, with the nut 22.

Figure 7:
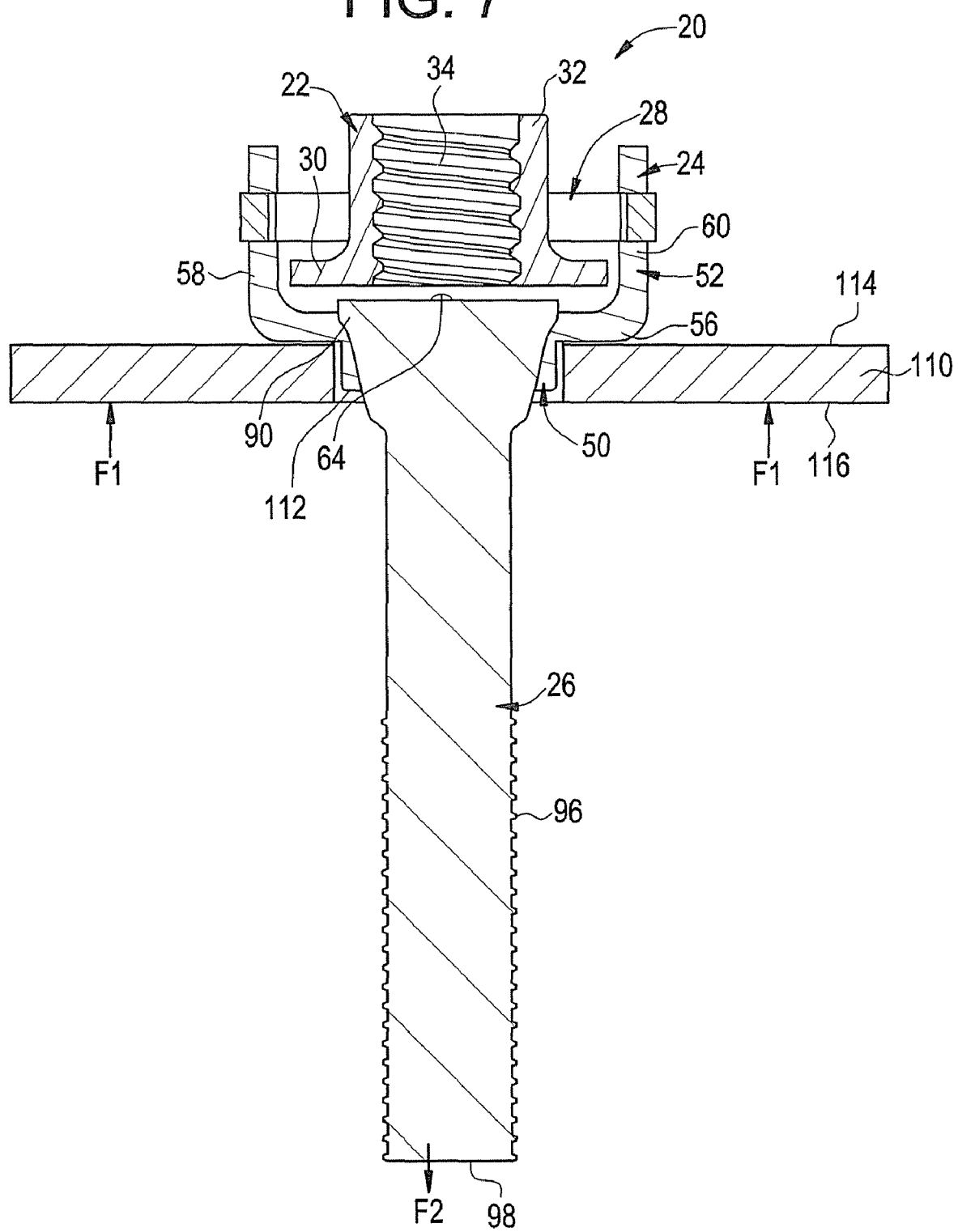

The nut plate assembly 20 is thus formed. The nut plate assembly 20, in its preassembled form, is then inserted into an aperture 112 of a workpiece 110 by inserting the second end 98 of the stem 26 and the tubular portion 50 of the holding bracket 24 into the aperture 112 of the workpiece 110, such that the undersurface 86 of the bracket portion 52 of the holding bracket 24 sits on a top surface 114 of the workpiece 110, as illustrated in FIG. 7. With the range of acceptable tolerances, the aperture 112 has a diameter which will range from being slightly larger to slightly smaller than an outer diameter of the tubular portion 50 of the holding bracket 24, which includes the lobes/ribs 88, if they are provided. The aperture 112 has a length which is preferably larger than or equal to a length of the tubular portion 50 of the holding bracket 24 such that the tubular portion 50 does not extend beyond the aperture 112 of the workpiece 110.

A holding or abutment force F1 is applied to a bottom surface 116 of the workpiece 110 and a tool (not shown) engages the tool engaging section 96 of the stem 26 and applies a force F2 to the stem 26 which is directed axially and in the opposite direction than the force F1 is applied to the workpiece 110, as illustrated in FIG. 7. The force F2 on the stem 26 seats the tubular portion 50 and the bracket portion 52 of the holding bracket 24 firmly against and within the workpiece 110.

Upon application of force F2 to the stem 26, the enlarged head portion 90 meets resistance from the shoulder 80 of the inner wall 76 such that the inner wall 76 is forced to expand radially outwardly as the enlarged head portion 90 deforms to the size of the expanded inner wall 76, with assistance from the cavity (not shown) in the enlarged head portion 90, if provided. As the inner wall 76 of the tubular portion 50 is inwardly tapered or stepped from the shoulder 80 to the second end 82 of the tubular portion 50, the enlarged head portion 90 will consistently have an outer diameter which is larger than the diameter of the inner wall 76 of the tubular portion 50, even though the enlarged head portion 90 deforms to assume the geometry relevant to the size of the expanded inner wall 76 of the tubular portion 50. Thus, the axial force F2 applied to the enlarged head portion 90 will place a continuous exertion of radial expansion on the inner wall 76 of the tubular portion 50. As the inner wall 76 is continuously expanded by the enlarged head portion 90, the outer wall 78 of the tubular portion 50 continuously expands radially outwardly within the aperture 112 against the wall of the workpiece 110, thus embedding the lobes/ribs 88 in the wall of the workpiece 110, if provided, in a fixed and intimate engagement with the wall of the aperture 112. The lobes/ribs 88 assist in the prevention of push-out, pull-out and torque-out of the nut plate 20 from the aperture 112 of the workpiece 110. If the lobes/ribs 88 are not provided on the outer wall 78 of the tubular portion 50, the tubular portion 50 will still be secured to the aperture wall of the workpiece 110 due to the high interference engagement and the coldworking of the walls defined by the aperture 112, but resistance to push-out, pull-out and torque-out will not be as great. When the lip 84 is provided in the inner wall 76 of the tubular portion 50, the enlarged head portion 90 pushes and embeds even more material of the tubular portion 50 into the wall of the aperture 112, as illustrated in FIG. 8A at 117, such that improved push-out, pull-out, torque-out characteristics are achieved. The deformation of the material at 117 into the wall of the aperture 112 is exaggerated for illustration purposes.

The enlarged head portion 90 of the stem 26 will initially expand the tubular portion 50 as well as place a compressive load on the components to seat them against the top surface 114 of the workpiece 110. The tubular portion 50 will expand to engage the wall of the aperture 112 in the workpiece 110. As this occurs, radial forces are established which are sufficient to deform the enlarged head portion 90 radially. Thus, the enlarged head portion 90 can handle tolerance variations in the workpiece aperture 112, and will continuously deform the tubular portion 50 radially outwardly to engage the aperture wall with sufficient force to cause the lobes/ribs 88, or alternate structure, if provided, on the outer wall 78 of the tubular portion 50 to embed in the wall of the aperture 112. As can be appreciated, the increasing wall thickness of the tubular portion 50 insures that radial deformation continues along the entire length of the tubular portion 50 to attain the desired degree of engagement of the lobes/ribs 88 in the wall of the aperture 112 such that improved push-out, pull-out, torque-out and fatigue characteristics are achieved.

Figure 8:
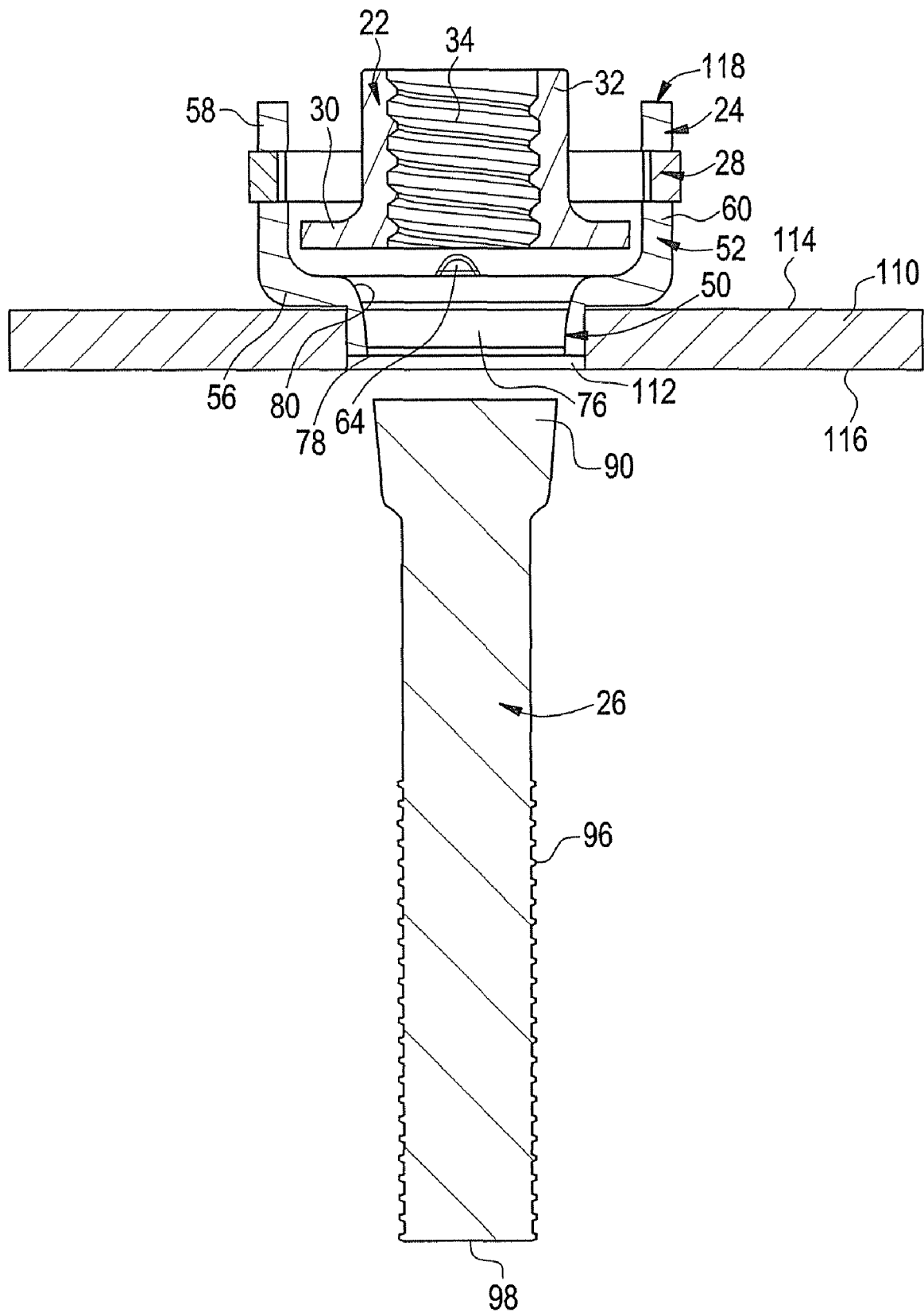
Figure 8A:
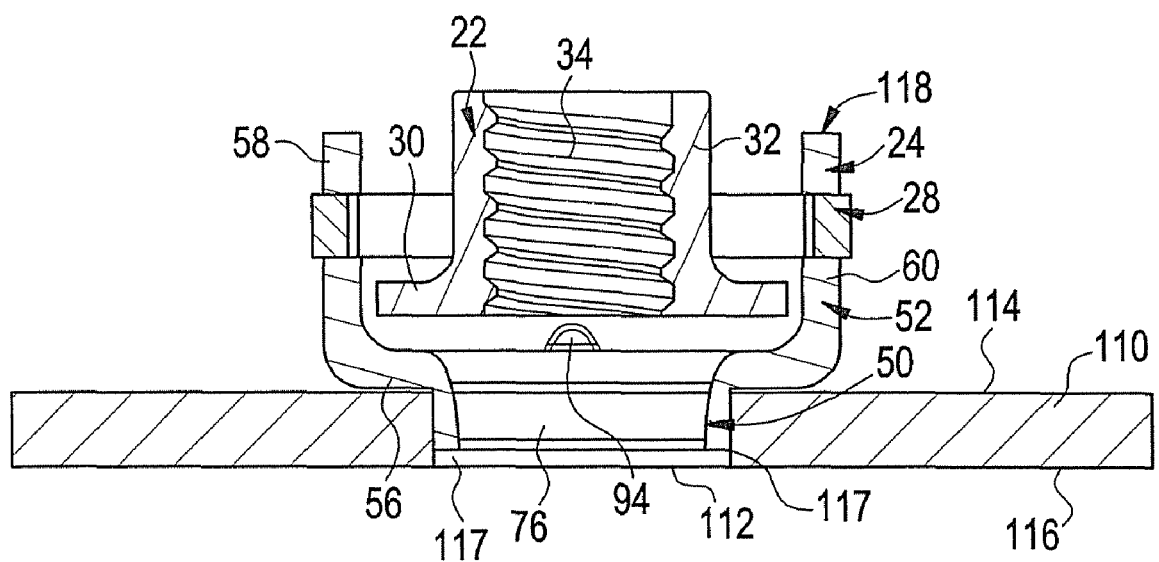

When the enlarged head portion 90 is pulled completely through the aperture 74 of the tubular portion 50, the holding bracket 24 is attached to the workpiece 110, as illustrated in FIG. 8 or 8A, and the stem 26 can be discarded. The holding bracket 24 attached to the workpiece 110, and the nut 22 secured within the holding bracket 24 by the retainer 28, provides a nut plate 118 which is secured to the workpiece 110.

With the nut plate 118 attached to the workpiece 110, a fastener 120, such as a bolt, can then be attached to the nut plate 118 and secure a second workpiece 121 to the workpiece 110 as illustrated in FIG. 9.

The fastener 120 typically includes a head portion 122 provided at a first end 124 thereof and an elongated portion 126 extending therefrom to a second end 128 of the fastener 120. The head portion 122 is typically configured such that a tool (not shown), for instance, a screwdriver or a wrench, can rotate the fastener 120. The elongated portion 126 is at least partially threaded.

The second workpiece 121 has a top surface 123, a bottom surface 125, and an aperture 127 therethrough.

In operation, the top surface 123 of the second workpiece 121 is positioned against the bottom surface 116 of the workpiece 110 such that the apertures 112, 127 are aligned. The second end 128 of the fastener 120 is then inserted into the aperture 127 from the bottom surface 125 of the second workpiece 121. The second end 128 is thus inserted into the aperture 112 of the workpiece 110 and then into the aperture 74 of the tubular portion 50 and into the aperture 34 of the nut 22. Upon rotation of the fastener 120 by the tool, and the holding in place of the nut 22, the threaded portion of the elongated portion 126 of the fastener 120 is caused to be threadedly engaged with the threaded aperture wall 36 of the nut 22. Rotation of the fastener 120 and threaded engagement of the fastener 120 and the nut 22 preferably ceases when the head portion 122 of the fastener 120 comes into contact with the bottom surface 125 of the workpiece 121, such that the fastener 120 is secured to the nut 22 of the nut plate 118, with the nut plate 118 being secured to the workpiece 110 and the workpiece 110 being secured to the second workpiece 121, as illustrated in FIG. 9.

Typically, this is the end of the process as there is no need to repair or replace the nut plate 118 or the fastener 120. If the fastener 120 is to be replaced for any reason, the tool can be used to rotate the fastener 120 in the opposite direction such that it is threadedly disengaged from the nut 22 and, thus, from the nut plate 118. A new fastener 120 can then be secured to the nut 22 and the nut plate 118 in the manner described.

If the nut plate 118, however, needs to be replaced for some reason, typically for the nut plate 118 not being set properly within the aperture 112 of the workpiece 110, or possibly for a part of the nut plate 118 being damaged or broken, the nut plate 118 can be replaced using the structure and method described herein.

First, the fastener 120 is removed by using the tool to rotate the fastener 120 in the opposite direction such that it is threadedly disengaged from the nut 22 and, thus, from the nut plate 118. The second workpiece 121 is thus removed from securement against the workpiece 110. Thereafter, the nut plate 118 is removed from its securement with the workpiece 110.

The nut plate 118 can be removed from its securement with the workpiece 110 in a variety of manners. For instance the nut plate 118 could be drilled out from the aperture 112 of the workpiece 110, or the nut plate 118 could be removed from its securement with the workpiece 110 by using a tool specifically designed for this purpose, such as any one of the tools described and illustrated in U.S. patent application Ser. No. 11/218,076, filed on Sep. 1, 2005, which has been incorporated herein by reference in its entirety.

Figure 11:
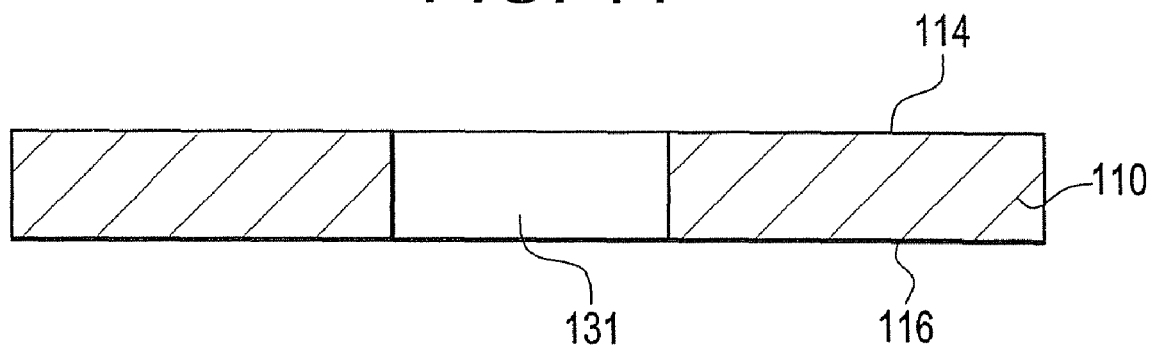
FIG. 11 illustrates the oversized aperture of the first workpiece after removal of the nut plate from the aperture by drilling.

Prior to the drilling operation, the nut 22 and the retainer 28 may be removed from the nut plate 118 if desired. In the drilling operation, as illustrated in FIG. 10, a drill bit 130 which is rotatable by a power tool (not shown), and which is generally of a diameter that is slightly larger than the diameter of the aperture 112 of the workpiece 110, drills from the bottom surface 116 of the workpiece 110. The drilling causes a portion of the workpiece 110 to be removed, thus enlarging the diameter of the aperture 112 of the workpiece 110, including that portion of the workpiece 110 to which the nut plate 118 is secured, thus allowing for the removal of the nut plate 118 from the aperture 112 of the workpiece 110. Thus, a new oversized aperture 131, which is of a larger diameter than the original aperture 112, of the workpiece 110 is provided as illustrated in FIG. 11. Because the new aperture 131 is of a larger diameter, a separate oversized fastener must now be used.

Figure 11A:
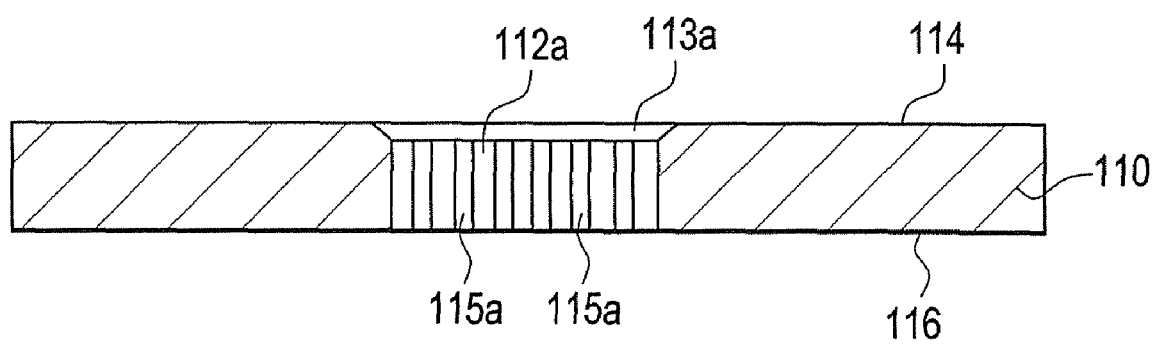
FIG. 11A illustrates the damaged aperture of the first workpiece after removal of the nut plate from the aperture by means other than drilling.
Figure 11B:
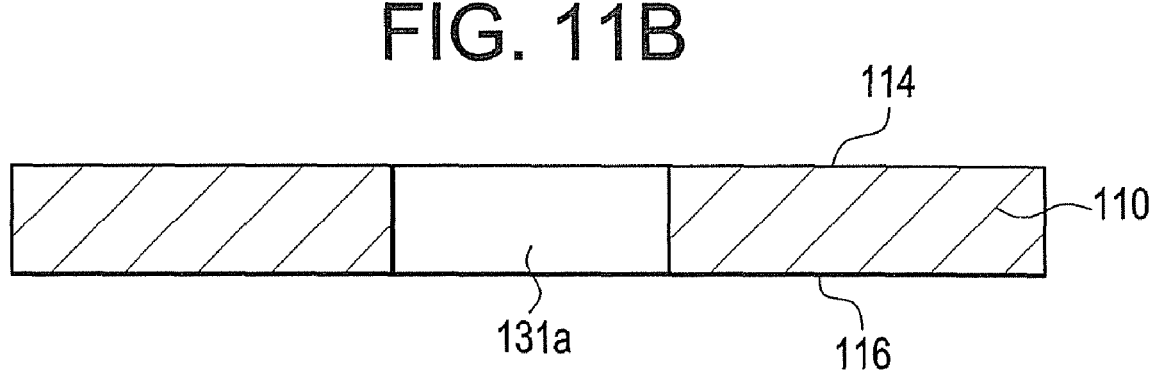
FIG. 11B illustrates the aperture of the first workpiece having been reworked/reconditioned after having been damaged as illustrated in FIG. 11A.

When the nut plate 118 is removed from securement with the workpiece 110 by other than drilling, the aperture 112 of the workpiece 110 may be damaged to form a damaged aperture 112a, as illustrated in FIG. 11A. The damaged aperture 112a may have a countersink or chamfer 113a and/or striations 115a formed on the aperture wall. In these instances, a tool, such as the one described and illustrated in U.S. patent application Ser. No. 11/218,076, filed on Sep. 1, 2005, which has been incorporated by reference herein in its entirety, can eliminate any minor countersinks caused by the installation of the nut plate 118, effectively repair the circumferential edge of the damaged aperture 112a, condition the wall of the damaged aperture 112a, and reduce the size/diameter of the damaged aperture 112a while introducing compressive residual stress into the area of the workpiece 110 surrounding the damaged aperture 112a to form a reworked/reconditioned aperture 131a, as illustrated in FIG. 11B. It should be noted that if the drilling operation caused damage to the oversized aperture 131 of the workpiece 110, for example by not providing a consistent diameter throughout the length of the oversized aperture 131, that the oversized aperture 131 could be reworked/reconditioned to provide a reworked/reconditioned aperture 131a as discussed hereinabove.

In many cases, it is generally possible to then use an identical nut plate assembly 20. However, if the identical nut plate assembly 20 cannot be used, it is required that a separate oversized fastener be used. Whether the oversized aperture 131 or the reworked/reconditioned aperture 131a is provided, it is still undesirable to use the separate oversized fastener for the reasons discussed. It would be preferable to provide a solution where the identical nut plate assembly 20 could be used, and the present invention provides such a solution.

In the present invention, the identical nut plate assembly 20 can be used to replace the original nut plate assembly 20 which resulted in the nut plate 118 being secured to the workpiece 110 within either the oversized aperture 131 or the reworked/reconditioned aperture 131a. Specifically, a separate sleeve member 132 is provided for use with the nut plate assembly 20, the combination of which provides for a repair/replacement nut plate assembly 133, as illustrated in FIG. 12.

It should be noted that hereinafter the oversized aperture 131 and the reworked/reconditioned aperture 131a will be discussed as being identical for reference purposes, but hereinafter the drawings and description will only use reference numeral 131 to denote that the aperture 131 is either oversized or reworked/reconditioned.

The sleeve member 132 is best illustrated in FIGS. 12-20 and is generally cylindrical in configuration and has an aperture 134 which extends therethrough from a first end 136 thereof to a second end 138 thereof. The aperture 134 of the sleeve member 132 defines an inner wall 140 of the sleeve member 132. The inner wall 140 may be provided with a lip 142 at the second end 138 thereof such that a diameter of the aperture 134 at the second end 138 of the sleeve member 132 is less than a diameter of the aperture 134 at the first end 136 of the sleeve member 132. If the lip 142 is not provided, the aperture 134 preferably has a generally constant diameter from the first end 136 to the second end 138 of the sleeve member 132. The sleeve member 132 also has an outer wall 144.

Figure 13:
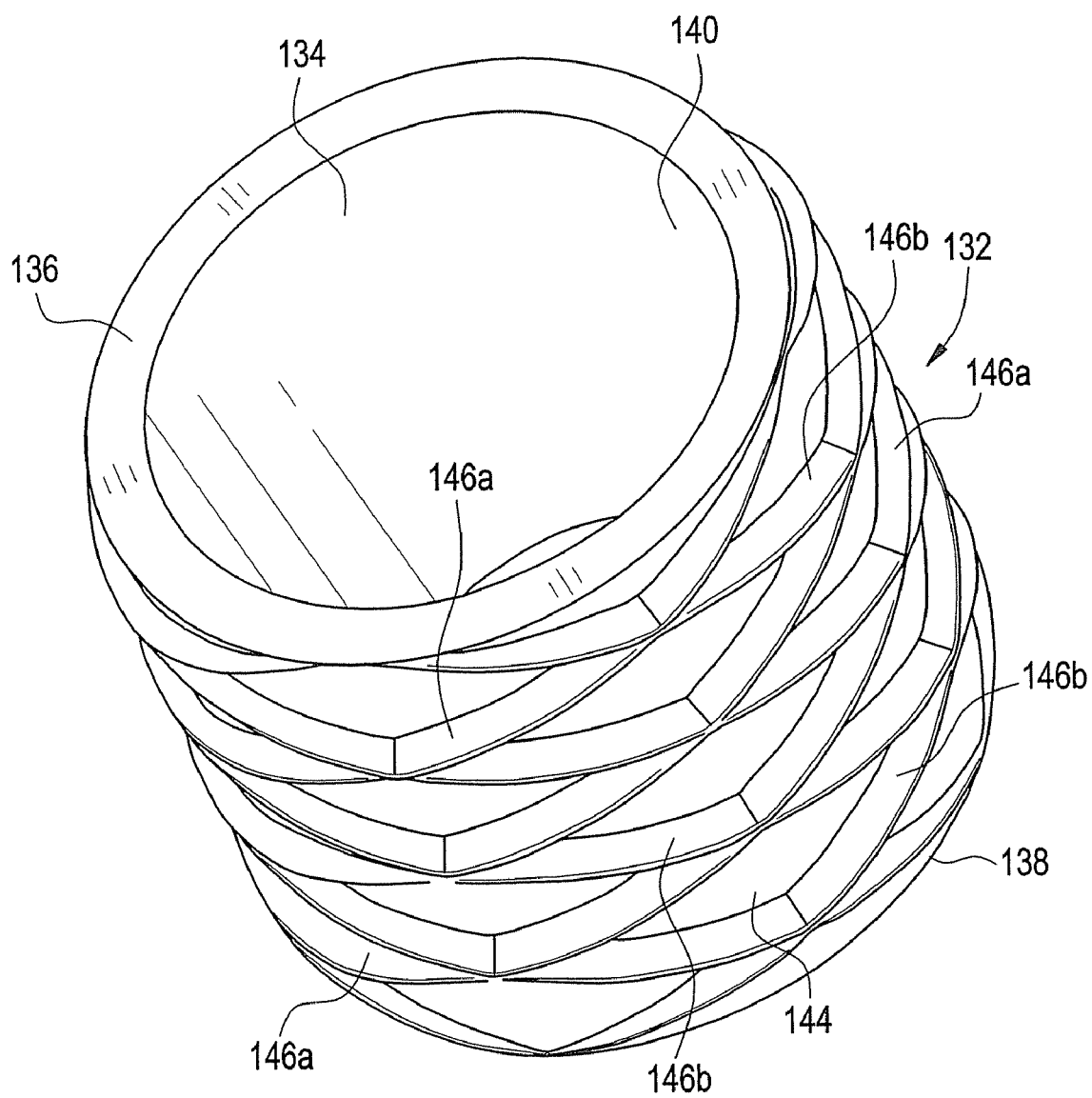
FIGS. 13-20 illustrate different configurations of lobes/ribs provided on an outer wall of a sleeve member of the repair/replacement nut plate assembly.
Figure 14:
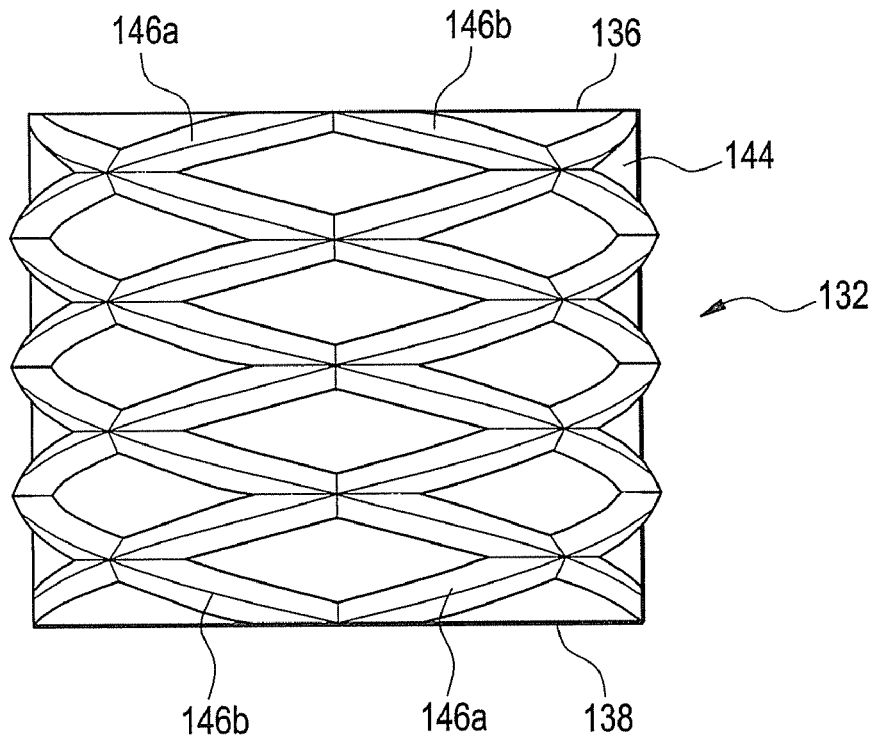
Figure 15:
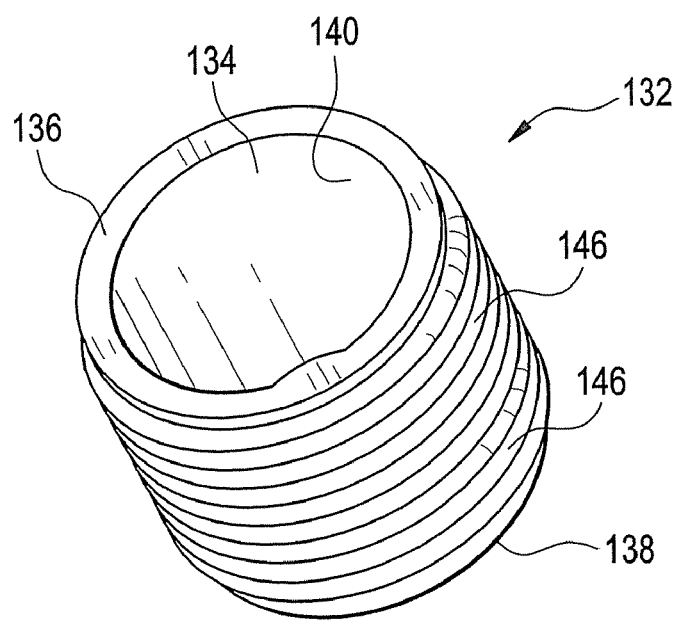
Figure 16:
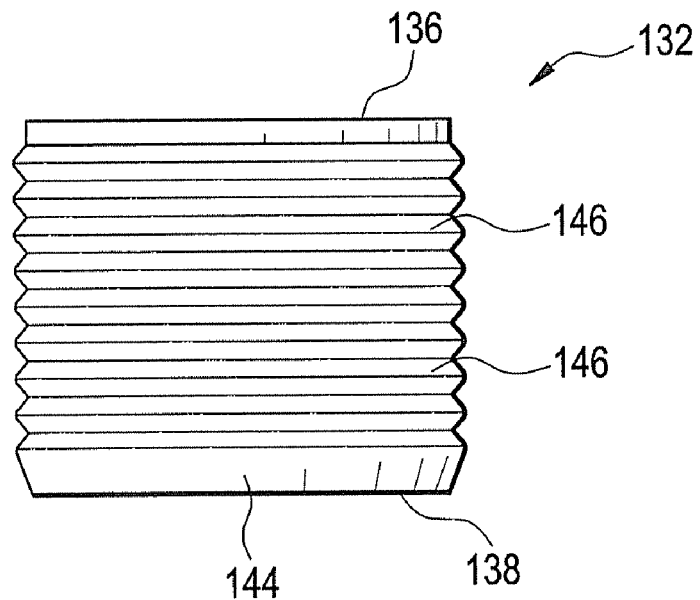
Figure 17:
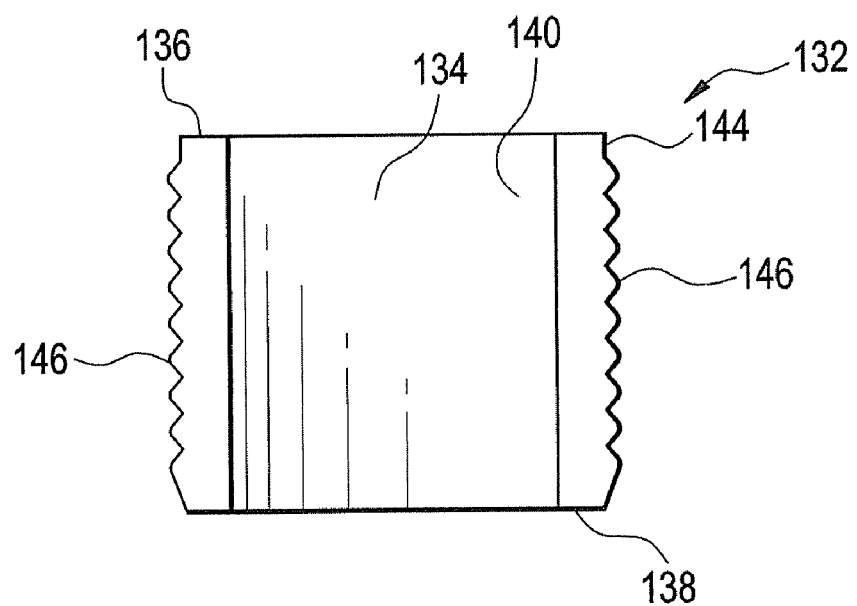
Figure 18:
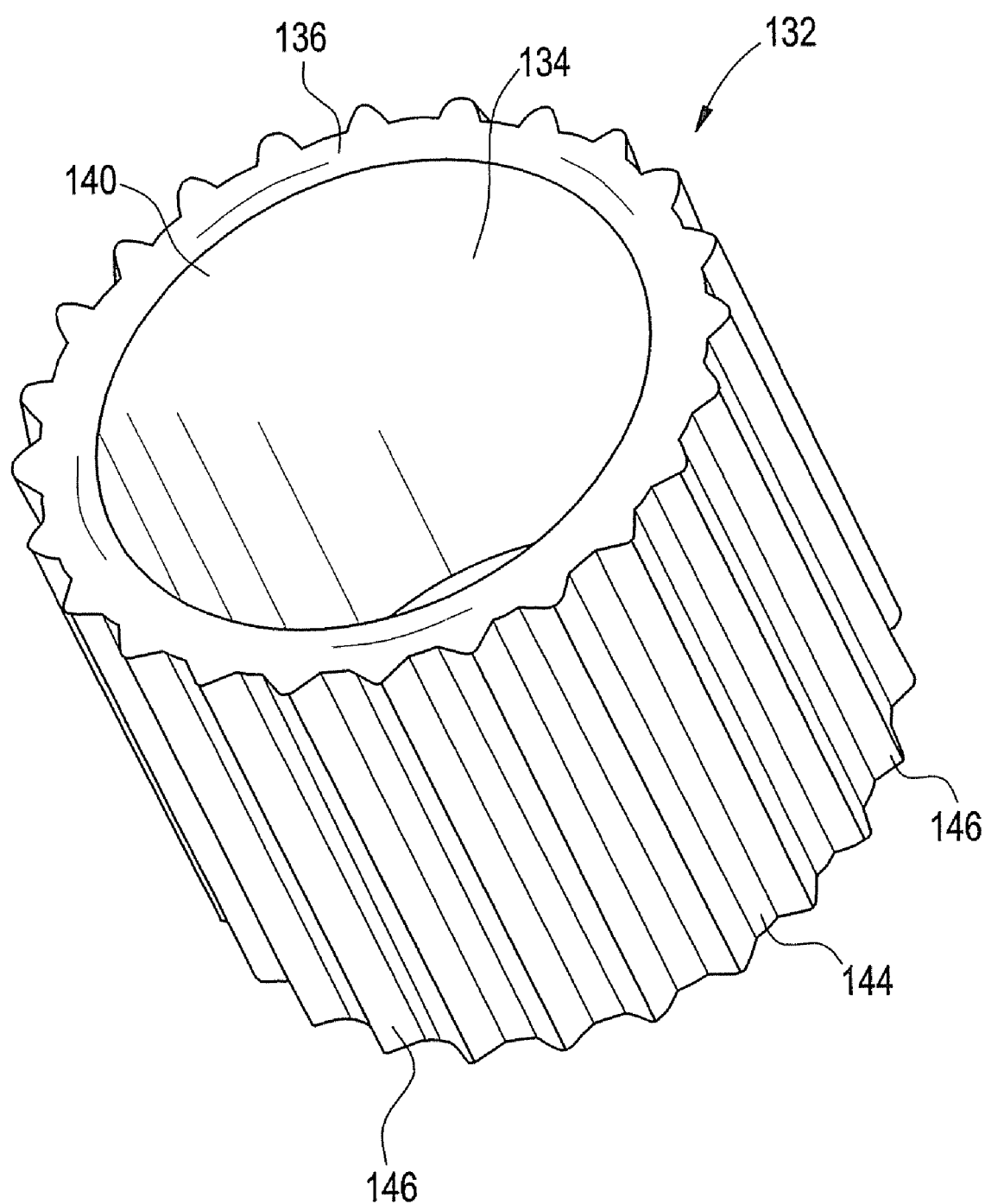
Figure 19:
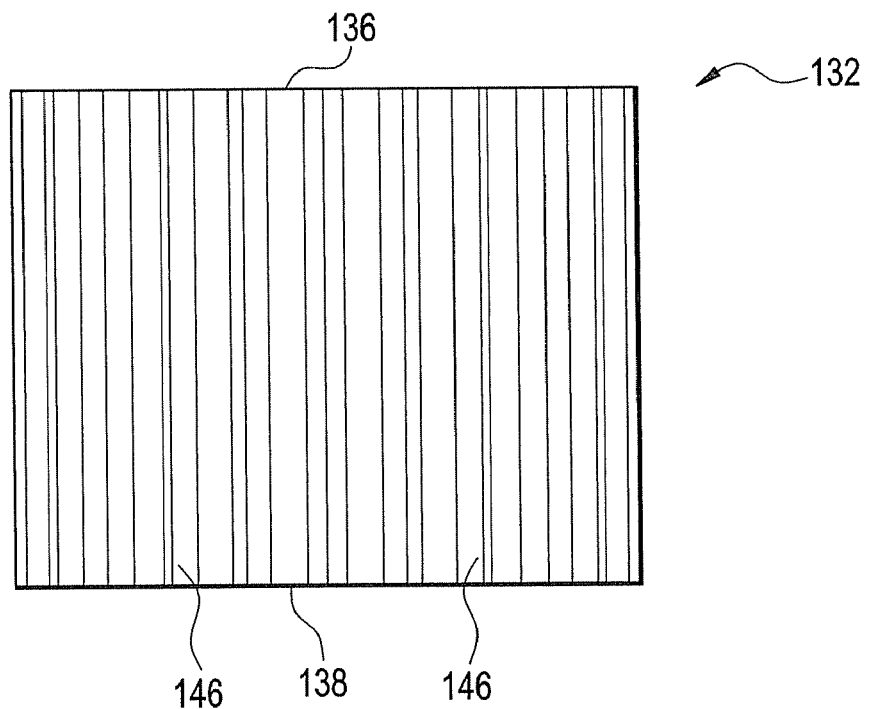
Figure 20:
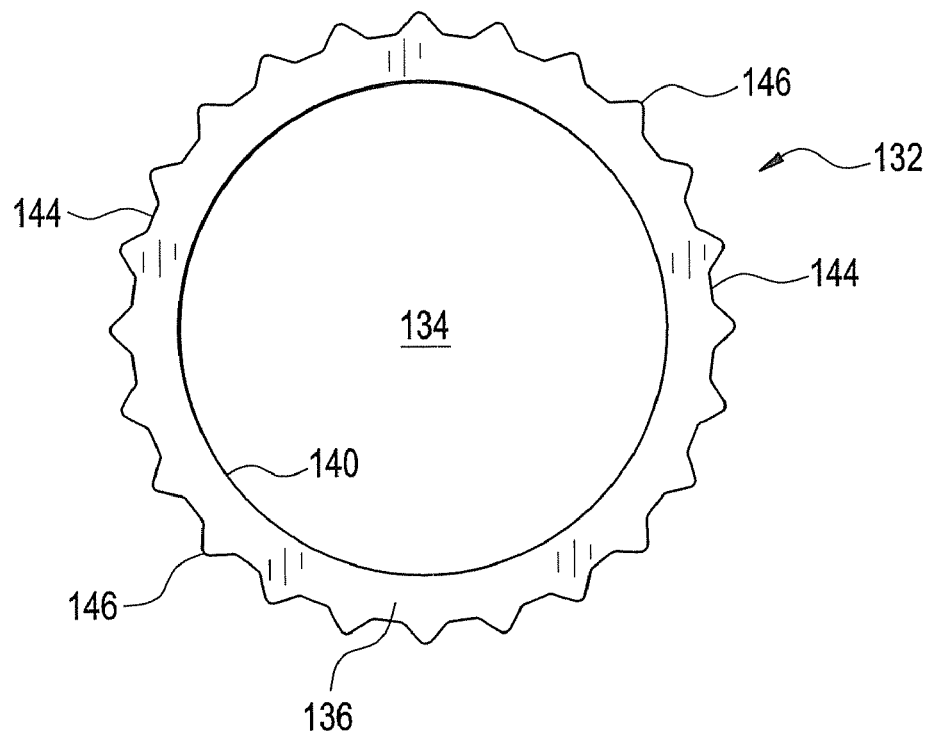

As illustrated in FIGS. 13-20, the outer wall 144 of the sleeve member 132 preferably has lobes or ribs 146 extending outwardly therefrom. The lobes/ribs 146 may be formed in any number of desired configurations on the outer wall 144 of the sleeve member 132, but are preferably formed in one of the three illustrated configurations in FIGS. 13-20. In FIGS. 13 and 14, the lobes/ribs 146 are formed in a crisscrossing manner from the first end 136 to the second end 138. In other words, a first set of lobes/ribs 146a extend outwardly from the outer wall 144 from the first end 136 to the second end 138 at an angle which is generally acute relative to the first end 136, and a second set of lobes/ribs 146b extend outwardly from the outer wall 144 from the first end 136 to the second end 138 at an angle which is generally obtuse relative to the first end 136, such that the first set of lobes/ribs 146a cross the second set of lobes/ribs 146b as illustrated in FIGS. 13 and 14. In FIGS. 15-17, the lobes/ribs 146 are formed in straight lines that extend outwardly from the outer wall 144 and which run parallel to the first and second ends 136, 138, such that each lobe/rib 146 does not come into contact with either the first end 136 or second end 138. In FIGS. 18-20, the lobes/ribs 146 are formed in straight lines that extend outwardly from the outer wall 144 and which run directly from the first end 136 to the second end 138. The lobes/ribs 146 are thus generally perpendicular to the first and second ends 136, 138.

The criss-crossing configuration of the lobes/ribs 146a, 146b illustrated in FIGS. 13 and 14 assists in the prevention of pull-out, push-out and torque-out as will be discussed hereinbelow. The horizontal configuration of the lobes/ribs 146 illustrated in FIGS. 15-17 assists in the prevention of push-out and pull-out as will be discussed hereinbelow. The vertical configuration of the lobes/ribs 146 illustrated in FIGS. 18-20 assists in the prevention of torque-out as will be discussed hereinbelow.

The sleeve member 132 can be configured to have various inner and outer diameters, various lengths, and be formed of various materials, as will be discussed herein.

Figure 21:
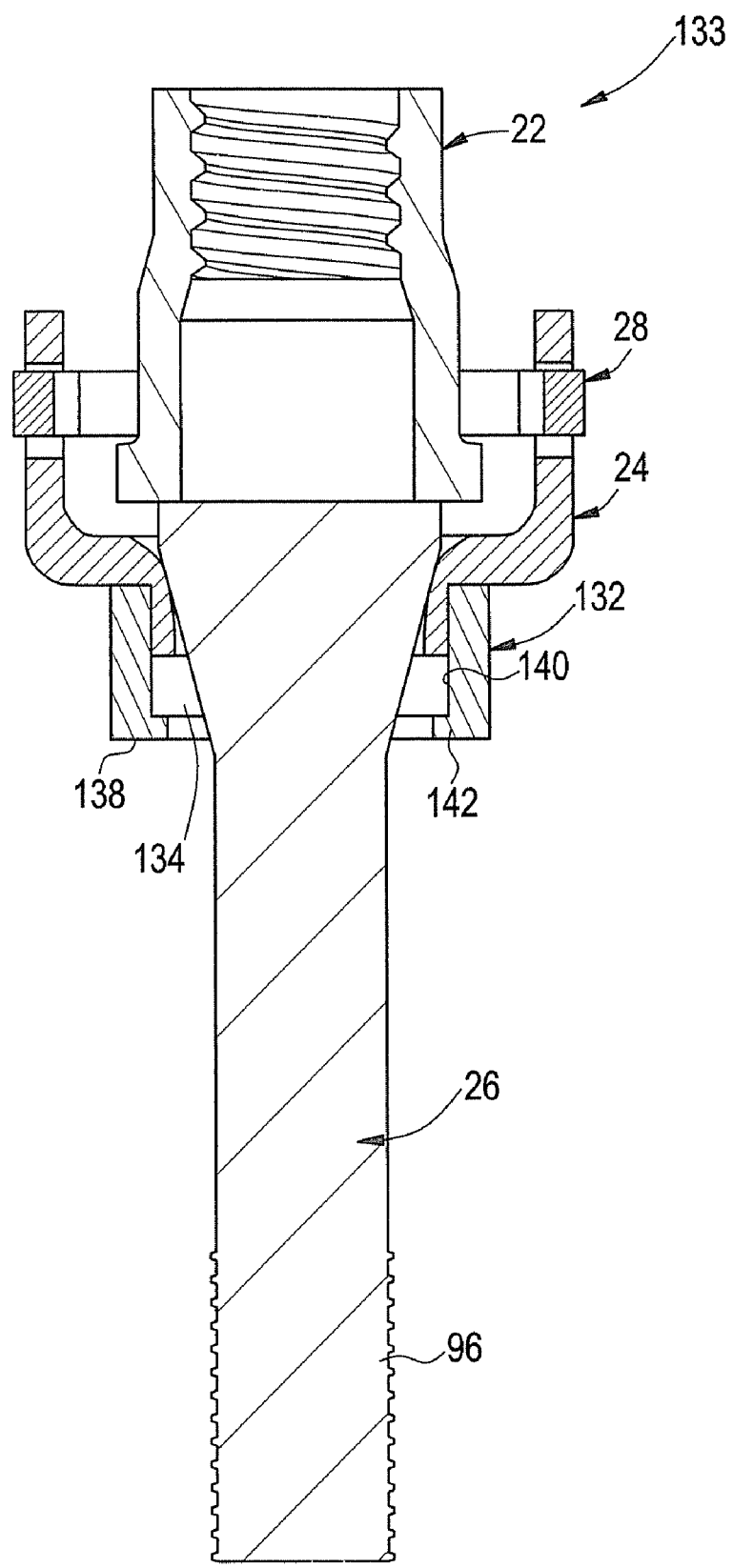

After the nut plate 118 is removed from the aperture 112 of the workpiece 110, an appropriate sleeve member 132 is selected for use with the nut plate assembly 20. The second end 98 of the stem 26 is inserted into and through the aperture 134 of the sleeve member 132, at the first end 136 thereof, and, thereafter, the second end 138 of the tubular portion 50 of the holding bracket 24 is inserted into the aperture 134 of the sleeve member 132 until the first end 136 of the sleeve member 132 generally abuts against the undersurface 86 of the bracket portion 52 of the holding bracket 24. The diameter of the inner wall 140 of the sleeve member 132 is generally identical to the diameter of the outer wall 78 of the tubular portion 50, including the dimensions of the lobes/ribs 88 if provided, such that the sleeve member 132 is generally secured to the tubular portion 50 by an interference fit or force fit, as illustrated in FIG. 21. If the lip 142 is provided on the inner wall 140 of the sleeve member 132, the diameter of the sleeve member 132 where the lip 142 is provided is preferably equal to or less than the smallest diameter of the aperture 74 of the tubular portion 50 of the holding bracket 24, which is preferably provided at the second end 82 of the tubular portion 50. A tool (not shown) can be provided to secure the sleeve member 132 to the tubular portion 50, or the sleeve member 132 can be secured to the tubular portion 50 manually. Thus, the diameter of the aperture 134 of the sleeve member 132 needs to be sized generally substantially the same as the diameter of the outer wall 144 of the tubular portion 50. With the sleeve member 132 secured to the nut plate assembly 20 in the manner described, the repair/replacement nut plate assembly 133 is provided.

The sleeve member 132 also preferably has a length, defined as a distance from the first end 136 to the second end 138, which is substantially equal to a thickness of the workpiece 110, defined as a distance from the top surface 114 to the bottom surface 116 of the workpiece 110. As the length of the tubular portion 50 of the holding bracket 24 was preferably equal to or less than the thickness of the workpiece 110, the length of the sleeve member 132 is preferably equal to or greater than a length of the tubular portion 50 of the holding bracket 24. The length of the sleeve member 132 is preferably equal to or greater than a length of the tubular portion 50 because the sleeve member is meant to replace lost material from the workpiece 110.

The sleeve member 132 also is preferably formed of the same material as the workpiece 110 is formed. For example, if the workpiece 110 is formed of aluminum, preferably the sleeve member 132 is also preferably formed of aluminum.

Figure 22:
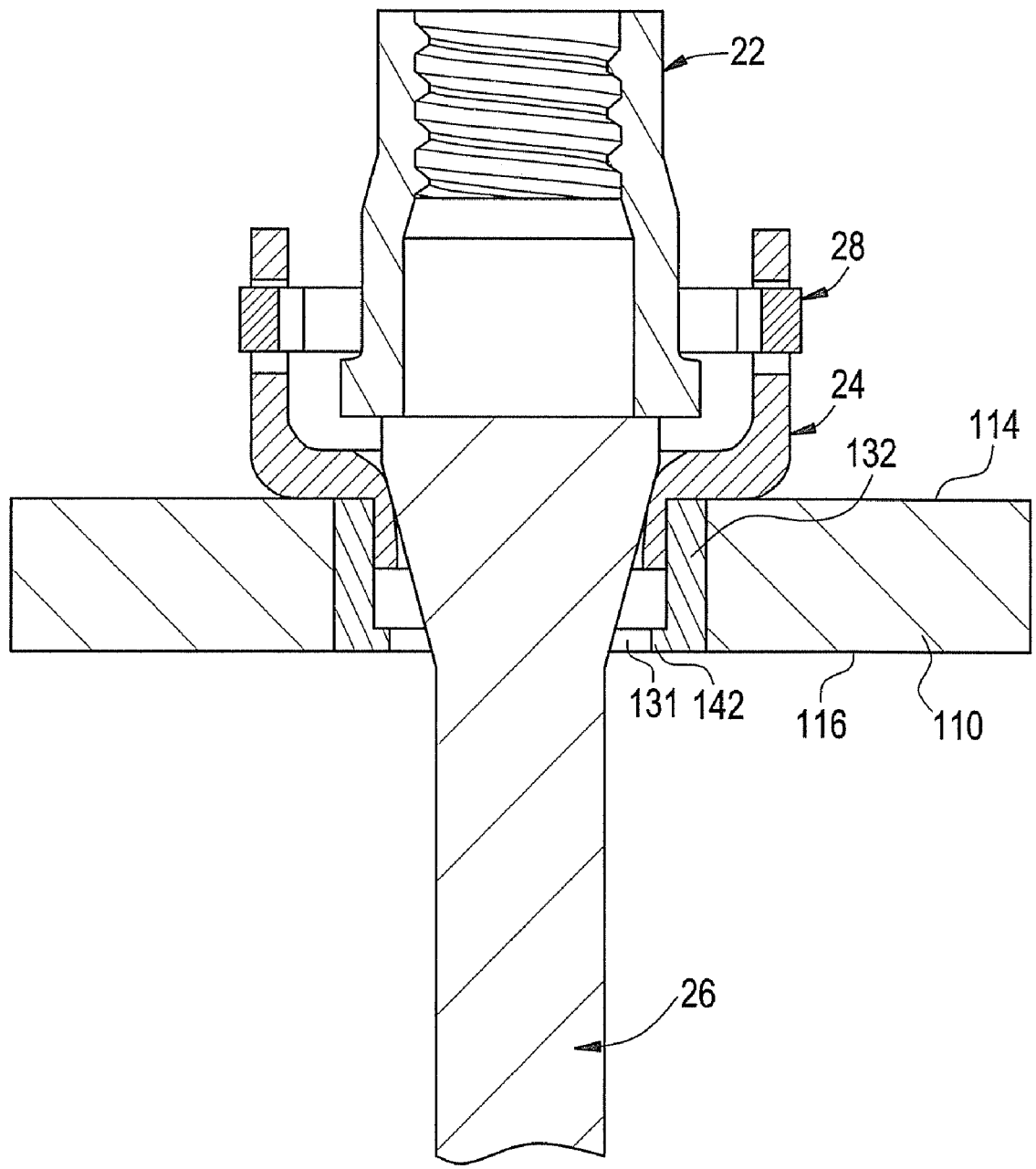

Once the sleeve member 132 is secured to the nut plate assembly 20 as described hereinabove to form the repair/replacement nut plate assembly 133, the repair/replacement nut plate assembly 133 is then inserted into either the oversized aperture 131 or the reworked/reconditioned aperture 131a of the workpiece 110 by inserting the second end 98 of the stem 26 and the sleeve member 132 into the aperture 131, 131a of the workpiece 110, such that the undersurface 86 of the bracket portion 52 of the holding bracket 24 sits on a top surface 114 of the workpiece 110, as illustrated in FIG. 22. Within the range of acceptable tolerances, the aperture 131, 131a has a diameter which will range from being slightly larger to slightly smaller than a diameter of the outer wall 144 of the sleeve member 132, which includes the lobes/ribs 146.

Thus, the configuration of the sleeve member 132 needs to be determined depending on the aperture 131, 131a of the workpiece 110, and depending on the material from which the workpiece 110 is formed. In most instances, the same type of sleeve member 132 will be able to be used.

Description of the setting of the repair/replacement nut plate assembly 133 will now be discussed as illustrated in FIGS. 22-24.

In operation, the sleeve member 132 is inserted into the aperture 131, 131a of the workpiece 110, such that the undersurface 86 of the bracket portion 52 of the holding bracket 24 sits on the top surface 114 of the workpiece 110, as illustrated in FIG. 22. The aperture 131, 131a has a diameter which is slightly larger or slightly smaller than the diameter of the tubular portion 50 of the holding bracket 24 within the range of acceptable tolerances. As explained hereinabove, the sleeve member 132 is of a length that is generally commensurate with the thickness of the workpiece 110 as the sleeve member 132 is compensating for lost material in the workpiece 110.

A holding or abutment force F1 is applied to the bottom surface 116 of the workpiece 110 and a tool (not shown) engages the tool engaging section 96 of the stem 26 and applies a force F2 to the stem 26 which is directed axially and in the opposite direction than the force F1 is applied to the workpiece 110, as illustrated in FIG. 22. The force F2 on the stem 26 seats the tubular portion 50 and the bracket portion 52 of the holding bracket 24 firmly against and within the workpiece 110.

Upon application of force F2 to the stem 26, the enlarged head portion 90 meets resistance from the shoulder 80 of the inner wall 76 such that the inner wall 76 is forced to expand radially outwardly as the enlarged head portion 90 deforms to the size of the expanded inner wall 76, with assistance from the cavity (not shown) in the enlarged head portion 90, if provided. As the inner wall 76 of the tubular portion 50 is inwardly tapered or stepped from the shoulder 80 to the second end 82 of the tubular portion 50, the enlarged head portion 90 will consistently have an outer diameter which is larger than the diameter of the inner wall 76 of the tubular portion 50, even though the enlarged head portion 90 deforms to assume the geometry relevant to the size of the expanded inner wall 76 of the tubular portion 50. Thus, the axial force F2 applied to the enlarged head portion 90 will place a continuous exertion of radial expansion on the inner wall 76 of the tubular portion 50. As the inner wall 76 is continuously expanded by the enlarged head portion 90, the outer wall 78 of the tubular portion 50 continuously expands radially outwardly against the inner wall 140 of the sleeve member 132, thereby causing the outer wall 144 of the sleeve member 132 to continuously expand radially outwardly within the aperture 131, 131a against the wall of the workpiece 110, thus embedding the lobes/ribs 146 of the sleeve member 132 in the wall of the workpiece 110 in a fixed and intimate engagement with the wall of the aperture 131, 131a, as best illustrated in FIGS. 23 and 24 at 147 The lobes/ribs 146, as described hereinabove, assist in the prevention of push-out, pull-out and torque-out of the sleeve member 132 and, thus, the nut plate 118 from the aperture 131, 131a of the workpiece 110. If the lobes/ribs 146 are not provided on the outer wall 144 of the sleeve member 132, the sleeve member 132 will still be secured to the aperture wall of the workpiece 110 due to the high interference engagement and the coldworking of the walls defined by the aperture 131, 131a, but resistance to push-out, pull-out and torque-out will not be as great. When the lip 84 is provided in the inner wall 76 of the tubular portion 50, the enlarged head portion 90 pushes and embeds even more material of the tubular portion 50 into the sleeve member 132 and, thus, even more material of the sleeve member 132 is pushed and embedded into the wall of the aperture 131, 131a such that improved push-out, pull-out, torque-out characteristics are achieved.

When the enlarged head portion 90 is pulled completely through the aperture 74 of the tubular portion 50, the sleeve member 132 is attached to the workpiece 110 and the holding bracket 24 is attached to the sleeve member 132, and the enlarged head portion 90 remains in the aperture 134 of the sleeve member 132. When the lip 142 of the sleeve member 132 is not provided, as illustrated in FIG. 24, the enlarged head portion 90 will continue to be pulled through the remainder of the aperture 134 of the sleeve member 132 with generally no further contact being made with the inner wall 140 of the sleeve member 132 such that the stem 26 can be discarded. However, if the lip 142 of the sleeve member 132 is provided, as illustrated in FIG. 23, the enlarged head portion 90 will come into contact with the lip 142 of the sleeve member 132 and will push and embed even more material of the sleeve member 132 into the wall of the aperture 131, 131a at point 149 such that improved push-out, pull-out, torque-out characteristics are achieved. Thereafter, the stem 26 will move all the way through the aperture 140 of the sleeve member 132 and the stem 26 can be discarded.

The enlarged head portion 90 of the stem 26 will initially expand the tubular portion 50 as well as place a compressive load on the components to seat them against the top surface 114 of the workpiece 110. The tubular portion 50 will expand to engage the sleeve member 132 and the sleeve member 132 will expand to engage the wall of the aperture 131, 131a in the workpiece 110. As this occurs, radial forces are established which are sufficient to deform the enlarged head portion 90 radially. Thus, the enlarged head portion 90 can handle tolerance variations in the workpiece aperture 131, 131a, and will continuously deform the tubular portion 50 and the sleeve member 132 radially outwardly to engage the aperture wall with sufficient force to cause the lobes/ribs 146, or alternate structure, if provided, on the outer wall 144 of the sleeve member 132 to embed in the wall of the aperture 131, 131a. As can be appreciated, the increasing wall thickness of the tubular portion 50 insures that radial deformation continues along the entire length of the tubular portion 50 to attain the desired degree of engagement of the lobes/ribs 146 in the wall of the aperture 131, 131a such that improved push-out, pull-out, torque-out and fatigue characteristics are achieved.

The holding bracket 24 attached to the sleeve member 132, the sleeve member 132 attached to the workpiece 110, and the nut 22 secured within the holding bracket 24 by the retainer 28, provides a repair/replacement nut plate 148 which is secured to the workpiece 110.

Figure 25:
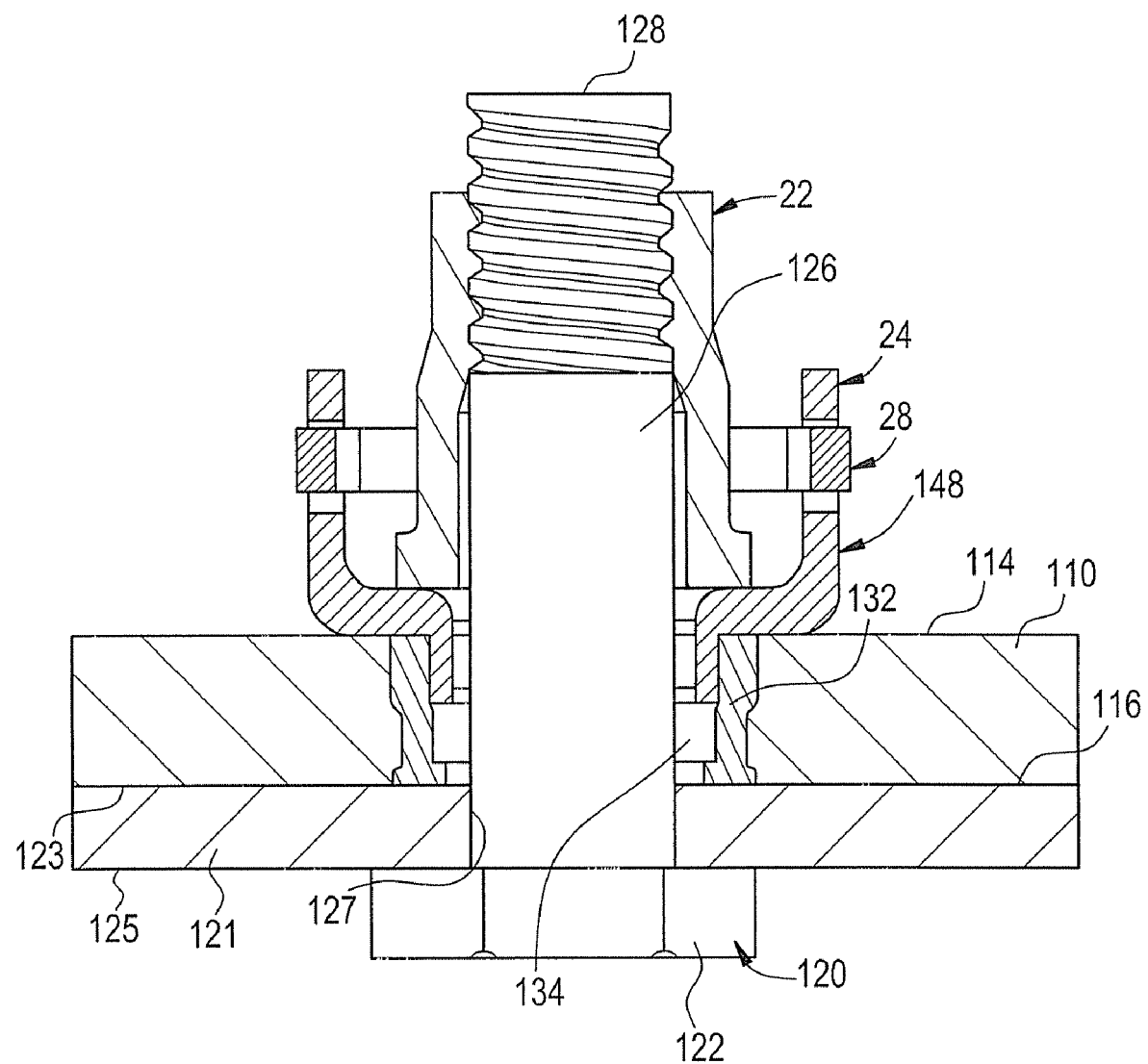

With the repair/replacement nut plate 148 secured to the workpiece 110 in the aperture 131, 131a, the fastener 120 can then be attached to the repair/replacement nut plate 148 thus securing the second workpiece 121 to the workpiece 110, as illustrated in FIG. 25, by inserting the second end 128 of the fastener 120 into the aperture 127 from the bottom surface 125 of the second workpiece 121. The second end 128 is thus inserted into the aperture 134 of the sleeve member 132 from the second end 138 thereof, and then into the aperture 74 of the tubular portion 50 and into the aperture 34 of the nut 22. Upon rotation of the fastener 120 by the tool, and the holding of the nut 22, the threaded portion of the elongated portion 126 of the fastener 120 is caused to be threadedly engaged with the threaded aperture wall 36 of the nut 22. Rotation of the fastener 120 and threaded engagement of the fastener 120 and the nut 22 preferably ceases when the head portion 122 of the fastener 120 comes into contact with the bottom surface 125 of the second workpiece 121 such that the fastener 120 is secured to the nut 22 of the repair/replacement nut plate 148, with the repair/replacement nut plate 148 being secured to the workpiece 110 and the workpiece 110 being secured to the second workpiece 121.

In those instances where a nut plate assembly is used that is generally different in configuration than the nut plate assembly 20 described herein, such that it is not feasible or practical to secure the sleeve member 132 to the tubular portion 50 of the holding bracket 24, or the like, the sleeve member 132 can conversely first be pressed into the aperture 131, 131a of the workpiece 110 by any press method of choice. Thereafter, the original nut plate assembly, or other type of fastener, can then be installed into the aperture 134 of the sleeve member 132 and secured thereto in the manner in which the original nut plate assembly, or other type of fastener, is typically secured to the workpiece 110.

Thus, the invention provides the ability to use the originally intended fastener as a part of the repair/replacement fastener in connection with oversized or reworked/reconditioned apertures. This will cut down on the costs of using, storing, manufacturing and/or acquiring custom oversize repair fasteners. The invention further allows for the installation of a standard rivetless nut plate assembly into an oversized or reworked/reconditioned aperture of a workpiece such that the mechanical properties of the repair/replacement nut plate assembly 133 conforms to the required specifications of the original nut plate assembly 20. This invention allows for repairing of a damaged or oversized aperture such that the geometry of the original desired aperture can be restored. The invention thus has universal applications for all types of fasteners.

While preferred embodiments of the invention are shown and described, it is envisioned that those skilled in the art may devise various modifications without departing from the spirit and scope of the foregoing description.

What is claimed is:

1. A method of replacing a nut plate fastener assembly that is installed in an aperture of a workpiece with a nut plate repair/replacement assembly, said method comprising the steps of:

removing the installed nut plate fastener assembly from the aperture in the workpiece in such a manner as to enlarge the aperture in the workpiece, thereby defining an oversized aperture wall;

providing a pre-assembled nut plate assembly which includes a nut having an aperture provided therethrough which defines an aperture wall which is at least partially threaded, a holding bracket, a stem and nut retaining means, wherein the holding bracket has a tubular portion having an aperture therethrough and a bracket portion which extends outwardly from the tubular portion, the stem having an enlarged head portion and an elongated portion which extends from the enlarged head portion, the enlarged head portion resting on a shoulder of the tubular portion proximate to the bracket portion and the elongated portion extending through and out of the aperture of the tubular portion, the nut being positioned in the bracket portion generally above the enlarged head portion of the stem, the nut retaining means being configured to prevent the nut from moving out of position in the bracket portion;

determining that the tubular portion of the pre-assembled nut plate assembly cannot properly engage with the oversized aperture wall of the workpiece upon radial expansion of the tubular portion by the stem being pulled therethrough such that the pre-assembled nut plate assembly cannot be installed in the oversized aperture of the workpiece;

selecting a sleeve member having an inner wall defined by an aperture through the sleeve member and an outer wall;

inserting the elongated portion of the stem of the pre-assembled nut plate assembly through the aperture of the sleeve member;

inserting the tubular portion of the pre-assembled nut plate assembly through the aperture of the sleeve member in such a manner as to secure the tubular portion to the sleeve member until the sleeve member generally abuts against an undersurface of the bracket portion of the pre-assembled nut plate assembly, in order to provide a nut plate repair/replacement assembly;

inserting the elongated portion of the stem, the tubular portion and the sleeve member of the nut plate repair/replacement assembly into the oversized aperture of the workpiece until the undersurface of the bracket portion of nut plate repair/replacement assembly generally abuts against a top surface of the workpiece; and pulling the enlarged head portion of the stem through and out of the aperture of the tubular portion which causes the tubular portion to radially expand outwardly which, in turn, causes the sleeve member to radially expand outwardly until the outer wall of the sleeve member properly engages with the oversized aperture wall of the workpiece, thereby providing a repair/replacement nut plate which is secured to the workpiece.

2. A method as recited in claim 1, further comprising providing that the sleeve member is cylindrical.

3. A method as recited in claim 1, further comprising providing that the inner wall of the sleeve member defines a lip such that an inner diameter of the sleeve member where the lip is provided is equal to or less than a smallest diameter of the aperture of the tubular portion.

4. A method as recited in claim 1, further comprising providing ribs or lobes on the outer wall of the sleeve member which are configured to be embedded into the oversized aperture wall of the workpiece upon the sleeve member being radially expanded.

5. A method as recited in claim 4, further comprising providing that the ribs or lobes criss-cross each other.

6. A method as recited in claim 4, further comprising providing that the ribs or lobes are configured as being straight lines.

7. A method as recited in claim 4, further comprising providing that the sleeve member has a first end and a second end, wherein the aperture extends from the first end to the second end, wherein the ribs or lobes are configured as being straight lines which run parallel to the first end and the second end of the sleeve member.

8. A method as recited in claim 4, further comprising providing that the sleeve member has a first end and a second end, wherein the aperture extends from the first end to the second end, wherein the ribs or lobes are configured as being straight lines which run from the first end to the second end of the sleeve member.

9. A method as recited in claim 1, further comprising the steps of:

providing a second workpiece having top and bottom surfaces and an aperture therethrough;

positioning the second workpiece to have the top surface of the second workpiece abut against a bottom surface of the workpiece having the repair/replacement nut plate secured thereto;

providing a fastener having a head portion and an elongated portion extending therefrom, the elongated portion being at least partially threaded;

inserting the elongated portion of the fastener through the aperture of the second workpiece, through the aperture of the sleeve member of the repair/replacement nut plate, through the aperture of the tubular portion of the repair/replacement nut plate, and into the aperture of the nut until the head portion of the fastener abuts against the bottom surface of the second workpiece;

threadedly engaging the threaded portion of the elongated portion of the fastener to the threaded portion of the aperture wall of the nut, thereby forming a nut plate fastener repair/replacement assembly in which the fastener is secured to the nut of the repair/replacement nut plate, the repair/replacement nut plate is secured to the workpiece having the oversized aperture, and the workpiece having the oversized aperture is secured to the second workpiece.

10. A method as recited in claim 1, wherein the oversized aperture of the workpiece is reworked/reconditioned.

11. A method as recited in claim 1, wherein the sleeve member has a first end and a second end and a length defined as a distance from the first end to the second end, wherein the length of the sleeve member is substantially equal to a thickness of the workpiece having the oversized aperture, wherein the thickness of the workpiece having the oversized aperture is defined as a distance from the top surface to the bottom surface.

12. A method as recited in claim 1, wherein the sleeve member has a first end and a second end and a length defined as a distance from the first end to the second end, wherein the length of the sleeve member is substantially equal to or greater than a length of the tubular portion.

13. A method as recited in claim 1, wherein when the undersurface of the bracket portion of nut plate repair/replacement assembly generally abuts against the top surface of the workpiece having the oversized aperture, the sleeve member of the nut plate repair/replacement assembly is positioned entirely within the oversized aperture of the workpiece such that the sleeve member does not extend beyond the top or bottom surfaces of the workpiece having the oversized aperture.

14. A method as recited in claim 1, wherein the sleeve member and the workpiece having the oversized aperture are formed of the same material.

15. A method as recited in claim 1, wherein a diameter of the oversized aperture of the workpiece will range from being slightly larger to slightly smaller than a diameter of the outer wall of the sleeve member.

16. A method of replacing a nut plate fastener assembly that is installed in an aperture of a workpiece, said method comprising the steps of:

removing the installed nut plate fastener assembly from the aperture in the workpiece in such a manner as to enlarge the aperture in the workpiece, thereby defining an oversized aperture wall;

providing a pre-assembled nut plate assembly which includes a nut having an aperture provided therethrough which defines an aperture wall which is at least partially threaded, a holding bracket, a stem and nut retaining means, wherein the holding bracket has a tubular portion having an aperture therethrough and a bracket portion which extends outwardly from the tubular portion, the stem having an enlarged head portion and an elongated portion which extends from the enlarged head portion, the enlarged head portion resting on a shoulder of the tubular portion proximate to the bracket portion and the elongated portion extending through and out of the aperture of the tubular portion, the nut being positioned in the bracket portion generally above the enlarged head portion of the stem, the nut retaining means being configured to prevent the nut from moving out of position in the bracket portion;

determining that the tubular portion of the pre-assembled nut plate assembly cannot properly engage with the oversized aperture wall of the workpiece upon radial expansion of the tubular portion by the stem being pulled therethrough such that the pre-assembled nut plate assembly cannot be installed in the oversized aperture of the workpiece;

selecting a sleeve member having an inner wall defined by an aperture through the sleeve member and an outer wall, wherein the outer wall has a diameter which is equal to or greater than a diameter of the oversized aperture of the workpiece;

press-fitting the sleeve member into the oversized aperture of the workpiece such that the outer wall of the sleeve member engages with the oversized aperture wall of the workpiece;

inserting the elongated portion of the stem of the pre-assembled nut plate assembly through the aperture of the sleeve member;

inserting the tubular portion of the pre-assembled nut plate assembly through the aperture of the sleeve member until the sleeve member generally abuts against an undersurface of the bracket portion of the pre-assembled nut plate assembly and until the undersurface of the bracket portion of the pre-assembled nut plate assembly generally abuts against a top surface of the workpiece; and pulling the enlarged head portion of the stem through and out of the aperture of the tubular portion which causes the tubular portion to radially expand outwardly until the tubular portion properly engages with the inner wall of the sleeve member, wherein the radial expansion of the tubular portion causes the sleeve member to radially expand outwardly causing the outer wall of the sleeve member to further engage with the oversized aperture wall of the workpiece, thereby providing a repair/replacement nut plate which is secured to the workpiece.

17. A method as recited in claim 16, further comprising the steps of:

providing a second workpiece having top and bottom surfaces and an aperture therethrough;

positioning the second workpiece to have the top surface of the second workpiece abut against a bottom surface of the workpiece having the repair/replacement nut plate secured thereto;

providing a fastener having a head portion and an elongated portion extending therefrom, the elongated portion being at least partially threaded;

inserting the elongated portion of the fastener through the aperture of the second workpiece, through the aperture of the sleeve member of the repair/replacement nut plate, through the aperture of the tubular portion of the repair/replacement nut plate, and into the aperture of the nut until the head portion of the fastener abuts against the bottom surface of the second workpiece;

threadedly engaging the threaded portion of the elongated portion of the fastener to the threaded portion of the aperture wall of the nut, thereby fanning a nut plate fastener repair/replacement assembly in which the fastener is secured to the nut of the repair/replacement nut plate, the repair/replacement nut plate is secured to the workpiece having the oversized aperture, and the workpiece having the oversized aperture is secured to the second workpiece.

18. A method as recited in claim 16, wherein the oversized aperture of the workpiece is reworked/reconditioned.

19. A method as recited in claim 16, wherein the sleeve member has a first end and a second end and a length defined as a distance from the first end to the second end, wherein the length of the sleeve member is substantially equal to a thickness of the workpiece having the oversized aperture, wherein the thickness of the workpiece having the oversized aperture is defined as a distance from the top surface to the bottom surface.

20. A method as recited in claim 16, wherein the sleeve member has a first end and a second end and a length defined as a distance from the first end to the second end, wherein the length of the sleeve member is substantially equal to or greater than a length of the tubular portion.

21. A method as recited in claim 16, wherein after the sleeve member is press-fit into the oversized aperture of the workpiece, the sleeve member is positioned entirely within the oversized aperture of the workpiece such that the sleeve member does not extend beyond the top or bottom surfaces of the workpiece having the oversized aperture.

22. A method as recited in claim 16, wherein the sleeve member and the workpiece having the oversized aperture are formed of the same material.

23. A method as recited in claim 16, further comprising providing that the sleeve member is cylindrical.

24. A method as recited in claim 16, further comprising providing that the inner wall of the sleeve member defines a lip such that an inner diameter of the sleeve member where the lip is provided is equal to or less than a smallest diameter of the aperture of the tubular portion.

25. A method as recited in claim 16, further comprising providing ribs or lobes on the outer wall of the sleeve member which are configured to be embedded into the oversized aperture wall of the workpiece upon the sleeve member being press-fit into the oversized aperture wall and further embedded into the oversized aperture wall upon the sleeve member being radially expanded.

26. A method as recited in claim 25, further comprising providing that the ribs or lobes criss-cross each other.

27. A method as recited in claim 25, further comprising providing that the ribs or lobes are configured as being straight lines.

28. A method as recited in claim 25, further comprising providing that the sleeve member has a first end and a second end, wherein the aperture extends from the first end to the second end, wherein the ribs or lobes are configured as being straight lines which run parallel to the first end and the second end of the sleeve member.

29. A method as recited in claim 25, further comprising providing that the sleeve member has a first end and a second end, wherein the aperture extends from the first end to the second end, wherein the ribs or lobes are configured as being straight lines which run from the first end to the second end of the sleeve member.

* * * * *

UNITED STATES PATENT AND TRADEMARK OFFICE
CERTIFICATE OF CORRECTION

| | | |
|---|---|---|
| PATENT NO. | : 7,823,262 B2 | |
| APPLICATION NO. | : 11/683275 | |
| DATED | : November 2, 2010 | |
| INVENTOR(S) | : Rahmatollah Fakhri Toosky | |

It is certified that error appears in the above-identified patent and that said Letters Patent is hereby corrected as shown below:

Column 16, Line 1, "thereby fanning a nut plate" should read -- thereby forming a nut plate --

Signed and Sealed this
Second Day of August, 2011

David J. Kappos
*Director of the United States Patent and Trademark Office*